United States Patent
Yamaguchi et al.

(10) Patent No.: US 10,432,867 B2
(45) Date of Patent: Oct. 1, 2019

(54) IMAGING APPARATUS AND DISPLAY CONTROL METHOD FOR SELF-PORTRAIT PHOTOGRAPHY

(71) Applicant: Sony Corporation, Tokyo (JP)

(72) Inventors: Hiroaki Yamaguchi, Tokyo (JP); Yoshiro Furukawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/847,051

(22) Filed: Dec. 19, 2017

(65) Prior Publication Data

US 2018/0109735 A1    Apr. 19, 2018

Related U.S. Application Data

(63) Continuation of application No. 15/060,005, filed on Mar. 3, 2016, now Pat. No. 10,129,482, which is a (Continued)

(30) Foreign Application Priority Data

Apr. 25, 2012 (JP) .................................. 2012-099436

(51) Int. Cl.
*H04N 5/232* (2006.01)
*H04N 5/225* (2006.01)
(Continued)

(52) U.S. Cl.
CPC ....... *H04N 5/23293* (2013.01); *G06F 3/0482* (2013.01); *G06F 3/04817* (2013.01);
(Continued)

(58) Field of Classification Search
CPC .............. H04N 5/23293; H04N 5/232; H04N 5/23219; H04N 5/23216; H04N 1/0035;
(Continued)

(56) References Cited

U.S. PATENT DOCUMENTS 4,757,388 A * 7/1988 Someya ............. H04N 5/23293
348/211.6
6,943,839 B1    9/2005 Matsumoto
(Continued)

FOREIGN PATENT DOCUMENTS

CN        101335836 A    12/2008
CN        102006403 A    4/2011
(Continued)

OTHER PUBLICATIONS

International Search Report dated Jul. 27, 2013 in Patent Application No. PCT/JP2013/061000.
Sony Corporation: "Sony NEX-C3 Interchangeabie Lens Digital Camera", XP-002700337,Retrieved from the Internet: URL:http://www.sony.de/support/de/product/NEX-C3/manuals, Dec. 31, 2011, 43 pages.
Japanese Office Action dated Nov. 17, 2015 in corresponding Japanese Application No. 2012099436 (8 pages).
(Continued)

*Primary Examiner* — Chia Wei A Chen
(74) *Attorney, Agent, or Firm* — Oblon, McClelland, Maier & Neustadt, L.L.P.

(57) ABSTRACT

A display controller includes circuitry configured to cause a display device to display self-portrait photographing information in response to receiving an indication that the display device and an imaging unit are in a predetermined positional relationship.

26 Claims, 13 Drawing Sheets

Related U.S. Application Data continuation of application No. 14/385,951, filed as application No. PCT/JP2013/061000 on Apr. 5, 2013, now Pat. No. 9,313,410.

(51) Int. Cl.

| | | |
|---|---|---|
| *G06F 3/0481* | (2013.01) | |
| *H04N 9/73* | (2006.01) | |
| *G06F 3/0482* | (2013.01) | |
| *G06F 3/0484* | (2013.01) | |
| *G06F 3/0488* | (2013.01) | |
| *G06K 9/00* | (2006.01) | |
| *G06K 9/46* | (2006.01) | |
| *G06T 5/00* | (2006.01) | |
| *G06T 7/90* | (2017.01) | |

(52) U.S. Cl.
CPC ...... *G06F 3/04842* (2013.01); *G06F 3/04883* (2013.01); *G06K 9/00268* (2013.01); *G06K 9/00302* (2013.01); *G06K 9/4652* (2013.01); *G06T 5/00* (2013.01); *G06T 7/90* (2017.01); *H04N 5/2252* (2013.01); *H04N 5/23203* (2013.01); *H04N 5/23216* (2013.01); *H04N 5/23219* (2013.01); *H04N 5/23245* (2013.01); *H04N 9/73* (2013.01); *G06T 2207/30201* (2013.01)

(58) Field of Classification Search
CPC ............. H04N 1/00411; H04N 5/4403; H04N 21/42207; H04M 1/0214; H04M 1/0235; G06F 3/01; G06F 3/14; G06F 3/048
See application file for complete search history.

(56) References Cited

U.S. PATENT DOCUMENTS

| | | | |
|---|---|---|---|
| 7,046,286 B1 | 5/2006 | Kobayashi | |
| 7,881,601 B2 | 2/2011 | Kawahara | |
| 8,848,100 B2 | 9/2014 | Kuwahara et al. | |
| 9,118,876 B2* | 8/2015 | Felt | A45D 44/005 |
| 10,129,482 B2* | 11/2018 | Yamaguchi | H04N 5/2252 |
| 2002/0181722 A1* | 12/2002 | Hibino | G06F 1/162 381/92 |
| 2003/0203747 A1 | 10/2003 | Nagamine | |
| 2003/0210898 A1* | 11/2003 | Juen | G11B 27/034 386/217 |
| 2005/0068443 A1 | 3/2005 | Naito | |
| 2005/0157195 A1* | 7/2005 | Ohashi | H04M 1/0214 348/333.06 |
| 2007/0081818 A1 | 4/2007 | Castaneda | |
| 2007/0268397 A1* | 11/2007 | Udono | H04N 5/232 348/362 |
| 2007/0279511 A1* | 12/2007 | Misawa | H04N 5/2251 348/333.06 |
| 2008/0024643 A1 | 1/2008 | Kato | |
| 2008/0176605 A1 | 7/2008 | Choi | |
| 2008/0204565 A1 | 8/2008 | Yumiki | |
| 2008/0260375 A1 | 10/2008 | Yumiki | |
| 2008/0292299 A1 | 11/2008 | Kretz | |
| 2008/0300010 A1* | 12/2008 | Border | G06K 9/00228 455/556.1 |
| 2008/0309785 A1 | 12/2008 | Sugimoto | |
| 2008/0317285 A1 | 12/2008 | Abe | |
| 2008/0317455 A1 | 12/2008 | Abe | |
| 2009/0002519 A1* | 1/2009 | Nakamura | H04N 9/735 348/223.1 |
| 2009/0002540 A1* | 1/2009 | Suzuki | H04N 5/23293 348/333.05 |
| 2009/0111515 A1* | 4/2009 | Joo | H04M 1/0208 455/556.1 |
| 2009/0185047 A1* | 7/2009 | Takachi | G03B 13/36 348/222.1 |
| 2009/0231470 A1 | 9/2009 | Hitosuga | |
| 2009/0237521 A1* | 9/2009 | Nishijima | G06K 9/00255 348/222.1 |
| 2009/0251585 A1 | 10/2009 | Joseph | |
| 2009/0295943 A1* | 12/2009 | Kim | H04N 5/217 348/231.99 |
| 2009/0295976 A1* | 12/2009 | Choi | H04N 5/23293 348/333.11 |
| 2010/0020220 A1 | 1/2010 | Sugita | |
| 2010/0026836 A1 | 2/2010 | Sugimoto | |
| 2010/0157084 A1 | 6/2010 | Shimamura | |
| 2010/0173678 A1 | 7/2010 | Kim | |
| 2010/0214321 A1 | 8/2010 | Hokkanen | |
| 2010/0245287 A1 | 9/2010 | Thorn | |
| 2011/0008036 A1* | 1/2011 | Takatsuka | G03B 15/00 396/283 |
| 2011/0025873 A1 | 2/2011 | Wang | |
| 2011/0052139 A1* | 3/2011 | Oku | H04N 5/23293 386/224 |
| 2011/0063477 A1 | 3/2011 | Sugimoto | |
| 2011/0116685 A1 | 5/2011 | Sugita | |
| 2011/0128401 A1* | 6/2011 | Choi | G03B 17/20 348/222.1 |
| 2011/0135151 A1* | 6/2011 | Jang | G06T 15/503 382/103 |
| 2011/0149105 A1* | 6/2011 | Sasaki | H04N 5/232 348/222.1 |
| 2011/0241991 A1 | 10/2011 | Ogura | |
| 2011/0242361 A1* | 10/2011 | Kuwahara | A63F 13/10 348/231.4 |
| 2011/0267530 A1 | 11/2011 | Chun | |
| 2011/0298940 A1* | 12/2011 | Cheong | H04M 1/72522 348/222.1 |
| 2011/0317031 A1 | 12/2011 | Honda | |
| 2012/0028678 A1* | 2/2012 | Lim | H04N 5/2355 455/556.1 |
| 2012/0050578 A1* | 3/2012 | Aoki | G03B 17/14 348/240.2 |
| 2012/0075267 A1* | 3/2012 | Akifusa | H04N 5/23293 345/204 |
| 2012/0075495 A1* | 3/2012 | Fujiwara | H04N 5/23212 348/222.1 |
| 2012/0098992 A1 | 4/2012 | Hosoe | |
| 2012/0105579 A1* | 5/2012 | Jeon | H04N 5/2258 348/38 |
| 2012/0105676 A1 | 5/2012 | Park | |
| 2012/0120188 A1 | 5/2012 | Arai | |
| 2012/0134642 A1* | 5/2012 | Okamura | H04N 5/2252 386/230 |
| 2012/0146924 A1* | 6/2012 | Inoue | G06F 3/0418 345/173 |
| 2012/0274796 A1 | 11/2012 | Choi | |
| 2012/0280900 A1* | 11/2012 | Wang | G06F 3/0488 345/156 |
| 2012/0281101 A1 | 11/2012 | Fujinawa | |
| 2012/0281129 A1* | 11/2012 | Wang | H04N 5/232 348/333.01 |
| 2012/0307101 A1 | 12/2012 | Fukuya | |
| 2013/0169827 A1* | 7/2013 | Santos | H04N 5/23229 348/207.1 |
| 2013/0203462 A1* | 8/2013 | Tahk | G06F 3/04845 455/556.1 |
| 2013/0216154 A1* | 8/2013 | Li | G06K 9/00281 382/274 |
| 2013/0235245 A1* | 9/2013 | Eaton | H04N 5/23219 348/333.01 |
| 2014/0267594 A1* | 9/2014 | Furumura | H04N 5/23238 348/36 |
| 2015/0363095 A1* | 12/2015 | Jin | G06F 3/04817 715/765 |

FOREIGN PATENT DOCUMENTS

| | | |
|---|---|---|
| JP | H11-069204 A | 3/1999 |
| JP | 2001-249379 | 9/2001 |
| JP | 2004-201132 | 7/2004 |
| JP | 2005-099145 | 4/2005 |

(56) References Cited

FOREIGN PATENT DOCUMENTS

| | | |
|---|---|---|
| JP | 2005-134847 A | 5/2005 |
| JP | 2005-192093 | 7/2005 |
| JP | 2005-333469 A | 12/2005 |
| JP | 2006-042171 | 2/2006 |
| JP | 2006-109352 A | 4/2006 |
| JP | 2006-174444 A | 6/2006 |
| JP | 2006-237961 A | 9/2006 |
| JP | 2007-013768 A | 1/2007 |
| JP | 2007-36590 | 2/2007 |
| JP | 2007-053814 A | 3/2007 |
| JP | 2007-312014 A | 11/2007 |
| JP | 2007-324877 A | 12/2007 |
| JP | 2008-206137 | 9/2008 |
| JP | 2009-033237 | 2/2009 |
| JP | 2009-124350 A | 6/2009 |
| JP | 2000-164756 | 7/2009 |
| JP | 2009-147461 | 7/2009 |
| JP | 2009-164756 | 7/2009 |
| JP | 2009-175748 A | 8/2009 |
| JP | 2009-205675 A | 9/2009 |
| JP | 2010-160217 | 7/2010 |
| JP | 2010-199720 A | 9/2010 |
| JP | 2010-204844 A | 9/2010 |
| JP | 2010-211497 A | 9/2010 |
| JP | 2011-019051 | 1/2011 |
| JP | 2011-040852 A | 2/2011 |
| JP | 2011-55096 A | 3/2011 |
| JP | 2011-071673 | 4/2011 |
| KR | 10-2006-0019401 A | 3/2006 |
| KR | 10-2010-0015177 A | 2/2010 |
| KR | 10-2010-0027700 A | 3/2010 |

OTHER PUBLICATIONS

European Office Action dated Feb. 11, 2016 in Patent Application No. 13 718 918.9.
Combined Chinese Office Action and Search Report dated Jan. 26, 2017 in Patent Application No. 201310134313.1 (with English Translation).
Korean Office Action dated Feb. 7, 2017 in Patent Application No. 10-2014-7028916 (with English Translation).
Japanese Office Action dated Feb. 28, 2017 in Patent Application No. 2016-138914 (without English Translation).
Office Action dated Nov. 14, 2017 in Japanese Patent Application No. 2017-090969.
Office Action dated Dec. 5, 2017 in Korean Patent Application No. 10-2017-7020404 (with English language translation).
Office Action dated Feb. 20, 2018 in Japanese Patent Application No. 2017-090969.
Office Action issued in corresponding Japanese Application No. 2018-096032 dated Jun. 26, 2018, citing above references AO-AQ.
Office Action issued in corresponding Japanese Application No. 2018-096032 dated Sep. 18, 2018, citing above AO-AQ references.
Extended European Search Report dated Mar. 21, 2018 in Patent Application No. 18151390.4.
Office Action dated Apr. 4, 2018 in Korean Patent Application No. 10-2017-7036756 (with English language translation) citing documents AO-AQ therein, 10 pages.
"Digital Camera E-M5 Instruction Manual", Olympus, XP055458875, Feb. 2012, http://www.olympusamerica.com/files/oima_cckb/E-M5_Instruction_Manual_EN.pdf.

* cited by examiner

IMAGING APPARATUS AND DISPLAY CONTROL METHOD FOR SELF-PORTRAIT PHOTOGRAPHY

CROSS-REFERENCE TO RELATED APPLICATIONS

The present application is a continuation of U.S. application Ser. No. 15/060,005, filed Mar. 3, 2016, which is a continuation of U.S. application Ser. No. 14/385,951, filed Sep. 17, 2014, issued as U.S. Pat. No. 9,313,410, which is the National Stage of PCT/JP13/061000, filed Apr. 5, 2013, which claims priority to Japanese Patent Application No. 2012-099436, filed Apr. 25, 2012, the entire contents of each are incorporated herein by reference.

TECHNICAL FIELD

The present disclosure relates to a display control device and a display control method. The present disclosure relates particularly to a display control device and a display control method which are suitable for an imaging device.

BACKGROUND ART

Making an imaging device more efficient and more compact is preferable, especially a digital camera.

In recent years, a so-called "digital single lens camera," small-sized and lens-interexchangeable, has been introduced, and a so-called compact-type digital camera also gained deep-seated popularity. The digital single lens camera and the compact-type digital camera (these are hereinafter retailed to appropriately as a "digital camera" for short) are small-sized and of light weight and thus a user of the imaging device (hereinafter referred appropriately to as a "user," for short) may easily perform photographing using these imaging devices.

In the digital camera, imaging is performed by photoelectric conversion operation of an imaging element. Because of this, generally, the digital camera includes a display unit displaying a photographic object that the user wants to photograph.

The imaging device introduced is also equipped with the display unit, for example, arranged in the rear surface of the main body and others, which is movable to enable the photographing from different angles. In addition, in PTL 1, described below, it is disclosed that arrangement of an additional information image, displayed along with a captured image, is switched according to a movable state of the display unit.

CITATION LIST

Patent Literature

[PTL 1]
Japanese Unexamined Patent Application Publication No. 2005-123908

SUMMARY

Technical Problem

Incidentally, with respect to the imaging device, there is a demand for performing the photographing in which the body of the user operating the imaging device is included in a photographic object. For example, there is a case where the user performs the photographing with the lens of the imaging device facing toward him/her while supporting the imaging device with his/her hand.

For example, in a case where the display unit included in the imaging device is movable, the user may perform the photographing while checking the image relating to the photographic object (hereinafter referred appropriately to as a "photographic object image."), displayed on the display unit, if the display unit is capable of making the display unit face toward him/her. However, when the display unit faces toward the user, operability of the imaging device is degraded because buttons, keys, and the like arranged in the rear side and others, of the imaging device are difficult to operate.

Then, it is desirable that the photographing in which a user operating the imaging device includes his/her body in the photographic object is made easy.

Solution to Problem

A display controller includes circuitry configured to cause a display device to display self-portrait photographing information in response to receiving an indication that the display device and an imaging unit are in a predetermined positional relationship.

A display control method includes
receiving an indication that a display device and an imaging unit are in a predetermined positional relationship; and
displaying with display control circuitry self-portrait photographing information in response to receiving the indication.

A non-transitory computer readable medium having instructions stored therein that when executed by a processing circuit cause the processing circuit to perform a display control method, the method including
receiving an indication that a display device and an imaging unit are in a predetermined positional relationship; and
displaying with display control circuitry self-portrait photographing information in response to receiving the indication.

Advantageous Effects

According to at least one embodiment, the photographing in which the user includes his/her body in the photographic object may be made easy.

DESCRIPTION OF EMBODIMENTS

Embodiments of a display control device and a display control method are described below.

Descriptions are provided in the following sequence.
<1. First Embodiment>
1-1. Outlined Configuration of Imaging Device
(1-1-1. Configuration Example of Detection Unit)
(1-1-2. Example of Image Displayed on Display Unit)
1-2. One Example of Processing in Display Control Device
<2. Second Embodiment>
2-1. Outlined Configuration of Imaging Device
2-2. Outline of Operation of Imaging Device
2-3. One Example of Processing in Display Control Device
2-4. Arrangement of Icons
<3. Third Embodiment>
3-1. Outlined Configuration of Imaging Device
3-2. Outline of Operation of Imaging Device
3-3. One Example of Processing in Display Control Device
<4. Modification Examples>

Moreover, embodiments described below are suitable specific examples of a display control device and a display control method. Various limitations, which are technically preferable, are provided in the following description, but as long as there is no statement to the effect that the present disclosure is specifically limited, the examples of the display control device and the display control method are not limited to the embodiment described below.

<1. First Embodiment>

The suitable specific example of the display control device and the display control method according to the present disclosure are described below, taking a digital camera as an example. As apparent from the following description, application examples of the display control device and the display control method according to the present disclosure are not limited to the digital camera.

1-1. Outlined Configuration of Imaging Device

Figure 1A:
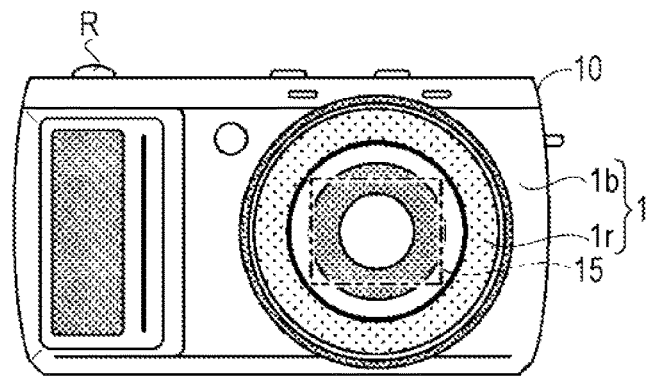
FIG. 1A is a front view illustrating one example of an imaging device to which a display control device according to an embodiment of the present disclosure is applied.

FIG. 1A is a front view illustrating one example of the imaging device to which the display control device according to the present disclosure is applied.

As illustrated in FIG. 1A, the imaging device 1, for example, is configured to include a main body 1b and a lens unit 1r. An imaging unit 15, which includes an imaging element for converting light from a photographic object to an electrical signal, is arranged inside a housing 10 of the main body 1b. The leas unit 1r includes a lens group for image-forming an image relating to the photographic object onto an imaging surface of the imaging element.

The lens unit 1r, for example, is attachable to and detachable from the mam body 1b. In a case where the lens unit 1r is attachable to and detachable from the main body 1b, a user may select the optimal lens unit from multiple kinds of lens unit according to a photographic scene and others. The main body 1b and the lens unit 1r, of course, may be configured to be integrated into one piece.

Figure 1B:
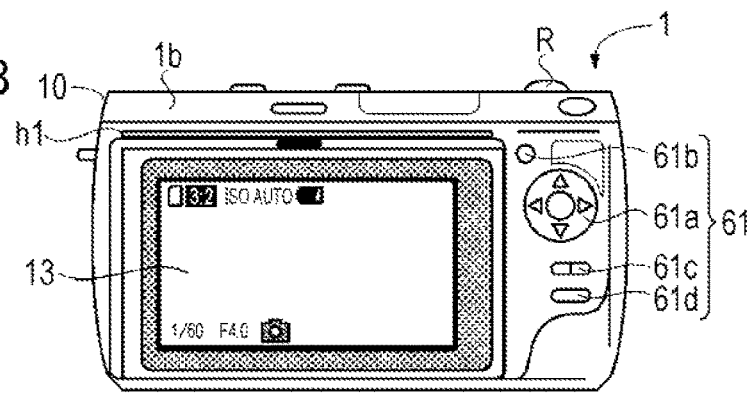
FIG. 1B is a rear view illustrating one example of the imaging device which the display control device according to the embodiment of the present disclosure is applied.

FIG. 1B is a rear view illustrating one example of the imaging device to which the display control device according to the embodiment of the present disclosure is applied.

As illustrated in FIG. 1B, a function button group 61 and a display unit 13, for example, are arranged in the rear surface of the main body 1b.

The function button group 61, for example, includes a so-called cross key 61a and buttons 61b to 61d. The function button group 61, for example, is used to perform a menu operation, a selection of a photographing mode that fits with a scene, and selection of image data displayed in the form of a thumbnail.

Moreover, a release button R is generally arranged, for example, on the upper surface of the main body 1b, and further on the right-hand side when viewed from the rear surface of the imaging device 1. When it is assumed that a right-handed user uses the imaging device 1, this helps him/her to easily operate the release button R while holding the imaging device 1 with his/her dominant hand.

The display unit 13, for example, is a display, such as a liquid crystal display (Liquid Crystal Display (LCD)), and an organic EL (Electroluminescence: electroluminescence effect) display. A photographic object image, obtained by photoelectric conversion operation of the imaging element, is displayed on the display unit 13. Furthermore, for example, setting values of various parameters in use for photographing, one or more icons for performing the menu operation and others, are displayed on the display unit 13, whenever necessary. Moreover, an illustration of the photographic object image obtained by the imaging element is omitted in FIG. 1B, in order to prevent the drawings from being complicated. This is also true for the following description.

Figure 1C:
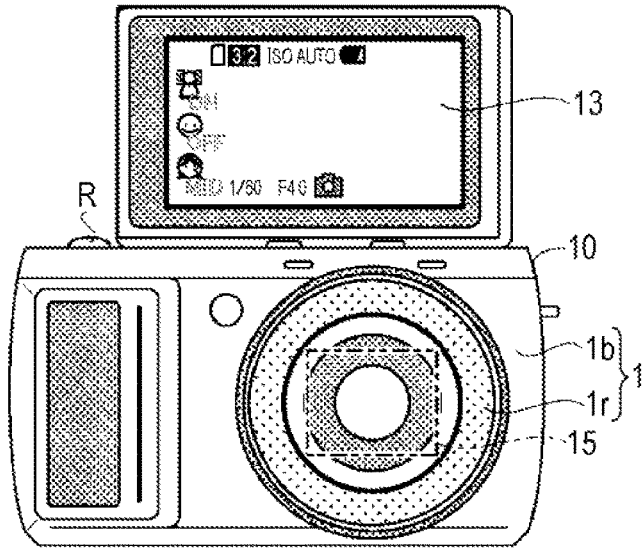
FIG. 1C is a schematic view illustrating a state where a display surface of a display unit of the imaging device illustrated in FIGS. 1A and 1B faces toward a photographic object.

FIG. 1C is a schematic view illustrating a state where the display surface of the display unit of the imaging device illustrated in FIGS. 1A and 1B faces toward the photographic object.

The display unit 13, for example, is connected to the housing 10 of the main body 1b using a hinge h1 and the like. For example, as illustrated in FIG. 1C, the display unit 13 has a free rotational movement with respect to the housing 10 of the main body 1b. As illustrated in FIG. 1C, the user may check the photographic object image and the like, in a state where the imaging unit 15 including the imaging element is made to face him/her by rotating the display unit 13 in such a manner that the display surface of the display unit 13 faces toward the photographic object.

Figure 2A:
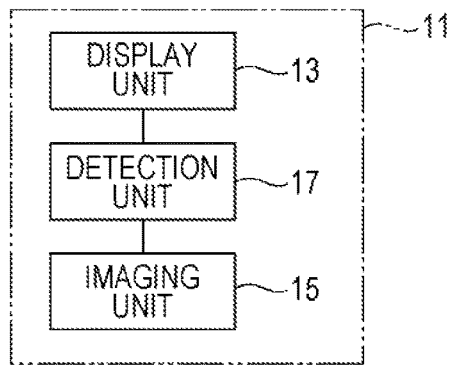
FIG. 2A is a block diagram illustrating an outline of a configuration of the display control device according to the embodiment of the present disclosure.

FIG. 2A is a block diagram illustrating an outline of a configuration of the display control device according to the embodiment of the present disclosure.

As illustrated in FIG. 2A, the display control device 11 according to the embodiment of the present disclosure includes a detection unit 17. The detection unit 17 detects whether or not the display unit 13 and the imaging unit 15 have a predetermined relationship with each other. The detection unit 17 is described in detail below. According to the present disclosure, at least one of an item of information relating to automatic recording of the photographic object image obtained by the imaging unit and an item of information relating to compensation of the photographic object image obtained by the imaging unit is displayed on the display unit, according to a result of detection by the detection unit.

Figure 2B:
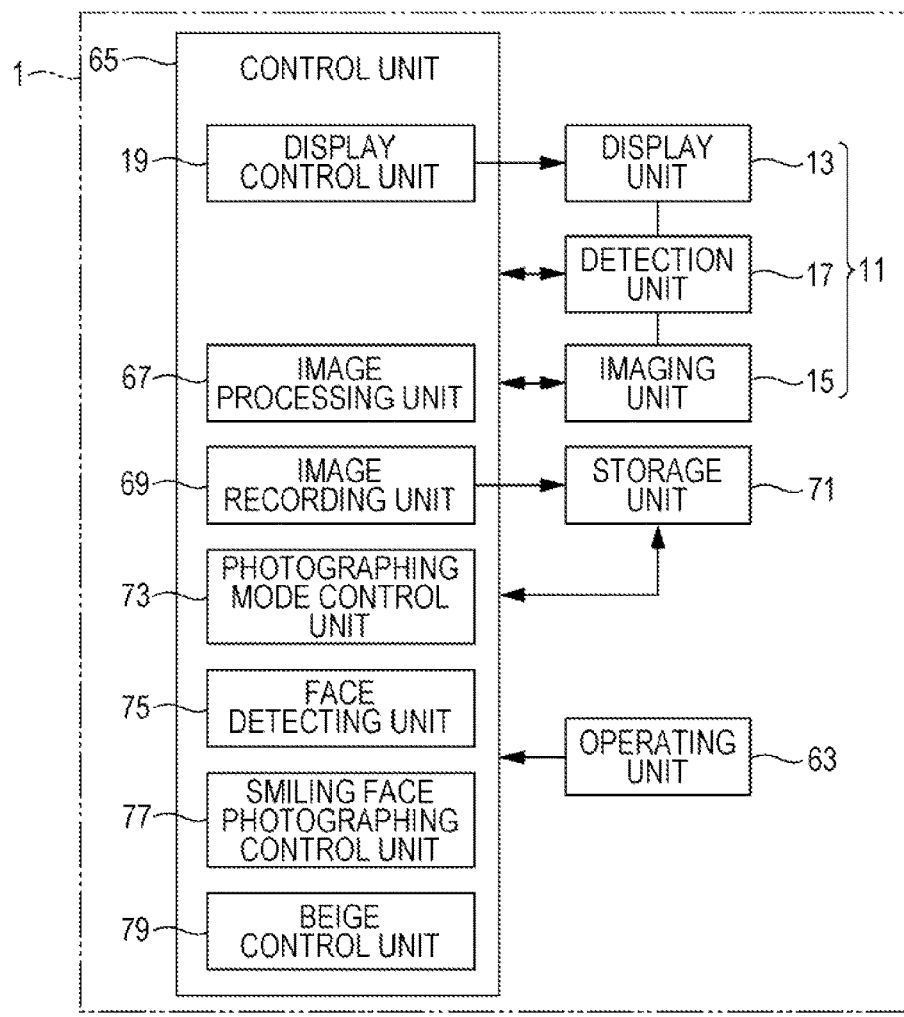
FIG. 2B is a block diagram illustrating one example of the configuration of the imaging device to which the display control device according to the embodiment of the present disclosure is applied.

FIG. 2B is a block diagram illustrating one example of the configuration of the imaging device to which the display control device according to the embodiment of the present disclosure is applied.

The imaging unit 15 includes the imaging element such as a CCD (charge-coupled device) and a CMOS (complementary metal-oxide semiconductor), and obtains an image signal relating to the photographic object, using the photoelectric conversion. The image signal relating to the photographic object, obtained by the imaging unit 15, is output to a control unit 65 described below.

An operating unit 63 includes the various buttons such as the function button group 61 described above and the release button R. The operating unit 63 functions as a user interface for operating the imaging device 1. The operating unit 63 may include an external control device such as a remote controller. An operating signal, received by the operating unit 63, which is in response to an input operation by the user, is output to the control unit 65 described below.

The control unit 65 is a processing device including a processor. The control unit 65, for example, is configured to include a digital signal processor (DSP) and a CPU (central processing unit). The control Unit 65 controls each unit of the imaging device 1 and outputs, for example, a result of processing that is in response to an input from the operating unit 63.

The control unit 65, for example, includes a display control unit 19, an image processing unit 67, an image recording unit 69, a photographing mode control unit 73, a face detecting unit 75, a smiling face photographing control unit 77, a complexion control unit 79 (also referred to as a beige control unit) and others. The display control Unit 19, the image processing unit 67, the image recording unit 69, the photographing mode control unit 73, the face detecting unit 75, the smiling face photographing control unit 77, and the complexion control unit 79 are sequentially described below.

The display control unit 19 performs display control in order to display various data on the display unit 13. Image data relating to the photographic object, obtained by the imaging unit 15, is enumerated as an example of data displayed on the display unit 13. The user may refer to the display unit 13 and thus may check a current state of the photographic object, by sequentially displaying the image data relating to the photographic object on the display unit 13.

The icons indicating an amount of remaining battery power and others, the setting values of parameters in use for photographing and others, are enumerated as examples in addition to data displayed on the display unit 13. Use and non-use of a stroboscope, shutter speed, diaphragm aperture, and ISO sensitivity, for example, are enumerated as the parameters in use for photographing. Moreover, the parameter in use for photographing includes also a parameter is use for photographing (hereinafter referred to as self-portrait photographing for convenience) in which the body of the user operating the imaging device 1 is included in the photographic object. As described below, self-timer and face detection, so-called "smile shutter," so-called "beige compensation," (or complexion color compensation and the like, for example, are enumerated as the parameters in use for self-portrait photographing.

The image processing unit 67 performs predetermined signal processing with respect to the image signal relating to the photographic object, which is output from the imaging unit 15, and outputs the post-signal-processing image signal. For example, digital gain adjustment, gamma correction, color correction, contrast compensation and the like are enumerated as the signal processing with respect to the image signal relating to the photographic object.

The image recording unit 69 compresses the post-signal-processing image signal, which is output from the image processing unit 67, using a compression coding method such as JPEG (Joint Photographic Experts Group), and outputs the post-compression data. The image data that is output from the image recording unit 69 is stored, for example, in a storage device 71.

The storage device 71, for example, includes an external storage device attachable to and detachable from the imaging device 1, and an internal storage device fixed inside the main body thereof. The image data obtained by photographing is saved in the storage device 71. The image data is saved in any one of the external storage device and the internal storage device, but for example the user may arbitrarily perform the setting to select either of the two.

Moreover, a program for performing various arithmetic operation processing and control of each unit of the imaging device 1, for example, is saved in RAM (Ram Access Memory) and ROM (Read-Only Memory) that are arranged in the control unit 65, the storage device 71 and the like connected to the control unit 65. A hard disk, a flash memory, an optical disc, a magneto-optical disc, MRAM (Magnetoresistive Random Access Memory) and the like, for example, are enumerated as the storage device 71.

The photographing mode control unit 73 performs control to perform the recording of the image data, which depends on the photographing mode selected by the user. Single shooting (the recording of the image data for every one frame), continuous shooting, photographing using a self-timer and the like, for example, are enumerated as the setting of the photographing mode.

The face detecting unit 75 detects a specific object from the image data relating to the photographic object, obtained by the imaging unit 15, for example, using pattern matching and the like. Here, the specific object, for example, is a face of a person or an animal included in the photographic object. Therefore, the face detecting unit 75 detects one or more of the faces included in the image data relating to the photographic object.

The user may select the face detection setting by performing the input operation on the operating unit 63, and may select between an ON state or an OFF state, as the setting value of the face detection.

The smiling face photographing control unit 77 performs the determination of whether or not the face defected by the face detecting unit 75 has a smiling face. The smiling face photographing control unit 77 performs the control to automatically perform the recording of the image data, in a case where the face detected by the face detecting unit 75 has the smiling face. In this manner, a function of automatically performing the recording of the image data according to the result of determining whether or not the photographic object has the smiling face is referred to as the "smile shutter." The smiling shutter also may be operated in a mode where the photograph is automatically taken when all detected faces are smiling. Similarly, the smiling shutter may be operated in a mode where the all the detected faces The user may set the smile shutter by performing the input operation on the operating unit 63, and may select between an ON state or an OFF state as the setting value of the "smile shutter." The user may further set to what extent the photographic object has to smile to perform the recording of the image data, in a case where the ON state is selected as the setting value of the "smile shutter." Specifically, the user, for example, may further set a "broad smile," a "usual smile," a "thin smile," or the like, as the "smile shutter" setting value.

The complexion color control unit 79 performs compensating on the image data recorded, in such a manner that the skin of the person looks smooth. The compensation of the image data relating specifically to the skin of the person's face, in the skin of the person, is referred to as the "beige compensation," or "complexion color compensation" That is, the completion control unit 79, for example, performs the image processing on the data relating to the face of the person, detected in the face detecting unit 75, and thus performs the compensation on the image data recorded, in such a manner that the face of the photographed person looks like smooth. Specifically, the complexion control unit 79 performs noise removal on the data relating to the face of the person so the surface features of the face and the complexion of the face do not appear unnatural.

The user may select the complexion compensation setting by performing the input operation on the operating unit 63, said may select between an ON state and an OFF state as the "complexion compensation" setting value. The user may further set the extent of the "complexion compensation" in a case where the ON state is selected as the "complexion compensation" setting value. Specifically, the user, for example, may further set "strong," "middle," "weak," or the like, as the "complexion compensation."

(1-1-1. Configuration Example of Detection Unit)

Next, a configuration example of the detection unit 17 and one example of operation of the detection unit 17 are described. As described above, the detection unit 17 detects whether or not the display unit 13 and the imaging unit 15 have a predetermined relationship with each other.

Here, the predetermined relationship, for example, refers to a relative positional relationship between the display unit 13 and the imaging unit 15. Specifically, the detection unit 17, for example, detects whether or not both of the display surface of the display unit 13 and the imaging surface of the imaging element face toward the photographic object. That is, the predetermined relationship is a relationship from which the photographic object may check the display content of the display unit 13. Therefore, for example, the detection unit 17 detects the rotational angle of the display unit 13 with respect to the housing 10 of the main body 1b, find the displaying direction of the display unit 13, in a case where the display unit 13 has the free rotational movement with respect to the housing 10 of the main body 1b.

In a case where both of the displaying direction of the display unit 13 and the imaging direction of the imaging unit 15 face toward the photographic object, by rotating or moving the display unit 13 with respect to the housing 10 of the main body 1b, the user may determine whether the photographing in which his/her body is included in the photographic object is performed. So, according to the present disclosure, it is presumed whether or not the user intends to perform the photographing in which his/her body is included in the photographic object, based on whether or not the display unit and the imaging unit are positioned in a predetermined arrangement.

Figure 3A:
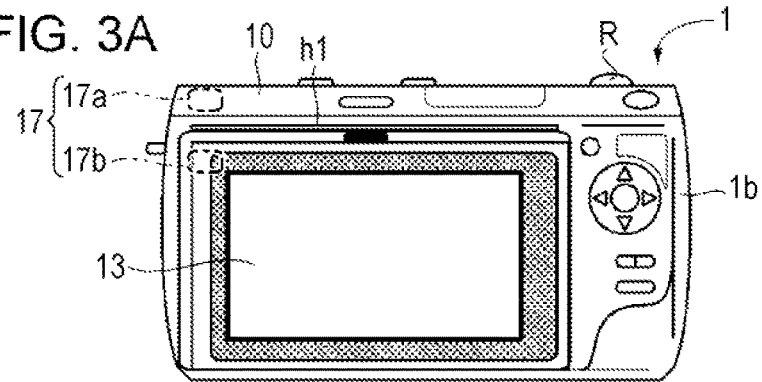
FIG. 3A is a schematic view illustrating one example of the configuration of the detection unit in the imaging device to which the display control device according to the embodiment of the present disclosure is applied.
Figure 3B:
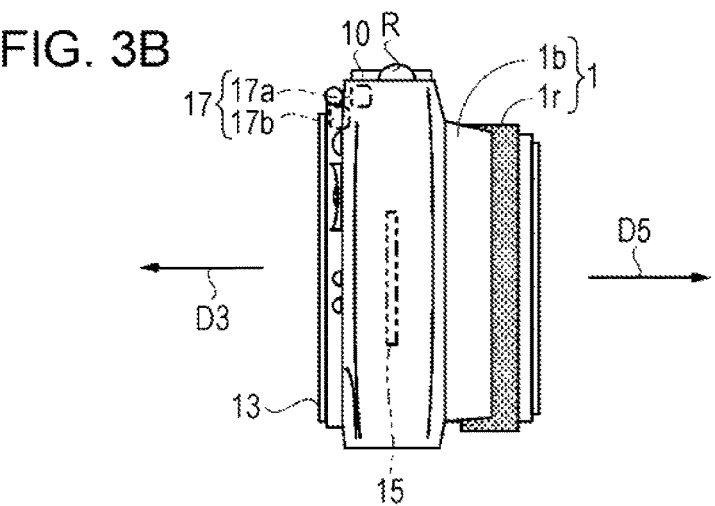
FIG. 3B is a schematic view illustrating one example of the configuration of the detection unit in the imaging device to which the display control device according to the embodiment of the present disclosure is applied.

FIGS. 3A and 3B are schematic views, each illustrating one example of the configuration of the detection unit in the imaging device to which the display control device according to the embodiment of the present disclosure is applied. FIG. 3A is a view illustrating the rear surface of the imaging device 1 to which the display control device 11 according to the embodiment of the present disclosure is applied. FIG. 3B is a left side view illustrating the imaging device 1 to which the display control device 11 according to the embodiment of the present disclosure is applied.

As illustrated in FIGS. 3A and 3B, the detection unit 17, for example, is configured from a set of a magnetic field sensor 17a and a magnet 17b. The magnetic field sensor 17a, for example, is arranged inside the housing 10 of the main body 1b and the magnet 17b, for example, is arranged inside the display unit 13. Of course, the magnetic field sensor 17a may be arranged inside the display unit 13, and the magnet 17b may be arranged inside the housing 10 of the main body 1b.

The magnetic field sensor 17a is a sensor that includes, for example, a Hall sensor. In the magnetic field sensor 17a, there are a digital output type sensor outputting a logical value that depends on the presence of a magnetic field (no distinction is made between a "magnetic flux density" and a "magnetic field" in the present specification) and an analog output type sensor outputting a signal that is proportional to a magnetic field size. As soon as it is detectable whether or not the display unit 13 and the imaging unit 15 are positioned in the predetermined arrangement, any one of the digital output type sensor and the analog output type sensor maybe used as the magnetic field sensor 17a.

Now, when the user intends to photograph the photographic object without including his/her body, the imaging surface of the imaging element faces toward the photographic object, and the face of the user and the display surface of the display unit 13, which are positioned to the opposite side of the imaging surface, face each other. In other words, the displaying direction of the display unit 13 and the imaging direction of the imaging unit 15 are approximately antiparallel with each other. In FIG. 3B, the displaying direction of the display unit 13 is schematically indicated by the arrow D3, and the imaging direction of the imaging unit 15 is schematically indicated by the arrow D5.

Figure 3C:
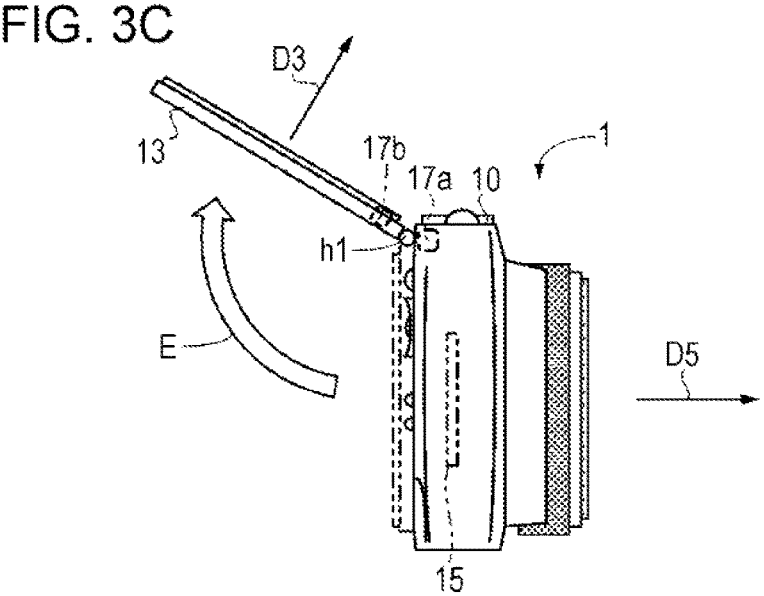
FIG. 3C is a left side view illustrating a state where rotation of the display unit with respect to a housing of a main body is in progress.

FIG. 3C is a left side view illustrating a state where the rotation of the display unit with respect to the housing of the main body is in progress.

As indicated by the arrow in FIG. 3C, when the display unit 13 is rotated with respect to the housing 10 of the main body 1b, in such a manner that the display surface of the display unit 13 faces toward the photographic object, also the magnet 17b moves as the display unit 13 is rotated. When this is done, as the magnet 17b moves, the magnetic field in the vicinity of the magnetic field sensor 17a also changes with the rotation of the display unit 13. Similarly, the display unit 13 may be attached to the housing 10 by a side hinge (left or right) such that the display surface is rotated around a left (or right) side of the housing 10 until the magnetic field sensor 17a, which in this variation is mounted on the left (or right) side of the housing 10, detects the magnet 17b (also mounted on the left, or right of the display unit 13. When the detection is made, it is known that the display surface of the display unit 13 faces toward the photographic object.

Figure 4A:
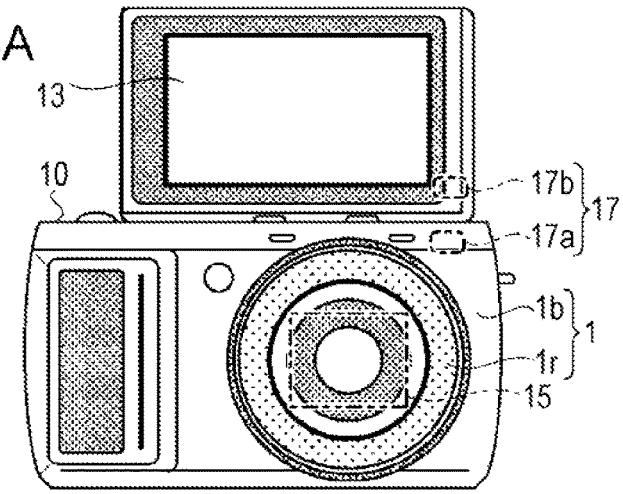
FIG. 4A is a front view illustrating a state where both of the display surface of the display unit and an imaging surface of an imaging element face toward the photographic object.
Figure 4B:
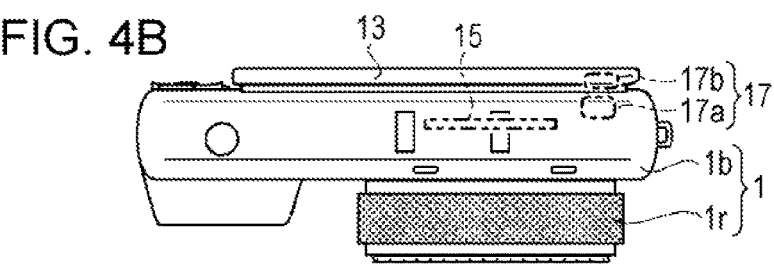
FIG. 4B is a top view illustrating a state where both of the display surface of the display unit and the imaging surface of the imaging element face toward the photographic object.
Figure 4C:
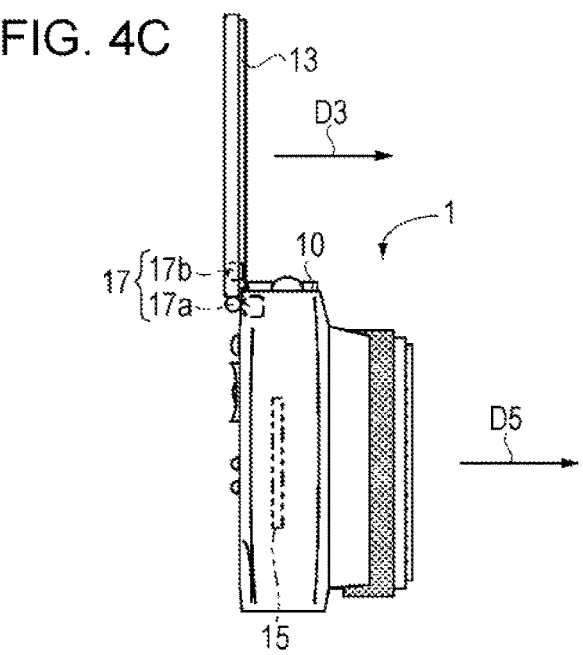
FIG. 4C is a left side view illustrating a state where both of the display surface of the display unit and the imaging surface of the imaging element face toward the photographic object.

FIG. 4A is a front view illustrating a state where both of the display surface of the display unit and the imaging surface of the imaging element face toward the photographic object. FIG. 4B is a top view illustrating a state where both of the display surface of the display unit and the imaging surface of the imaging element face toward the photographic object. FIG. 4C is a left side view illustrating a state where both of the display surface of the display unit and the imaging surface of the imaging element face toward the photographic object.

In FIG. 4C, the displaying direction of the display unit 13 is schematically indicated by the arrow D3, and the imaging direction of the imaging unit 15 is schematically indicated by the arrow D5. As illustrated in FIG. 4C, in the state where both of the displaying direction of the display unit 13 and the imaging surface of the imaging element face toward the photographic object, the displaying direction of the display unit 13 and the imaging direction of the imaging unit 15 are approximately parallel with each other.

Here, for example, when magnetic moment of the magnet 17b is parallel with the displaying direction (the direction indicated by the arrow D3) of the display unit 13, the direction of the magnetic field in the vicinity of the magnetic field sensor 17a is reversed in the state illustrated in FIG. 4C, compared to the direction illustrated in FIG. 3B. Therefore, the polarity of an output from the magnetic field sensor 17a is reversed, and from the polarity of the output from the magnetic field sensor 17a, the control unit 65 may determine whether or not both of the display surface of the display unit 13 and the imaging surface of the imaging element face toward the photographic object. In other words, the control unit 65 may determine whether or not the photographing is performed in which the body of the user operating the imaging device 1 is included in the photographic object, based on the result of the detection by the detection unit 17.

Moreover, in the example described above, the rotation of the display unit 13 with respect to the housing 10 is detected due to the change in the magnetic field, but the method of detecting the rotation and the movement of the display unit 13 with respect to the housing 10, of course, is not limited to this example. For example, in a case where the display unit 13 is rotatably connected to the housing 10 using a rotational arm and the like, to what extent the display unit 13 is rotated with respect to the housing 10 may be determined by detecting the rotational angle of the rotation arm. Otherwise, for example, contact of the display unit 13 with respect to the housing 10 may be detected, by providing an electrical point on the housing 10 and the display unit 13, or by providing a notch in any part of the housing 10 and the display unit 13.

(1-1-2. Example of Image Displayed on Display Unit)

Figure 5A:
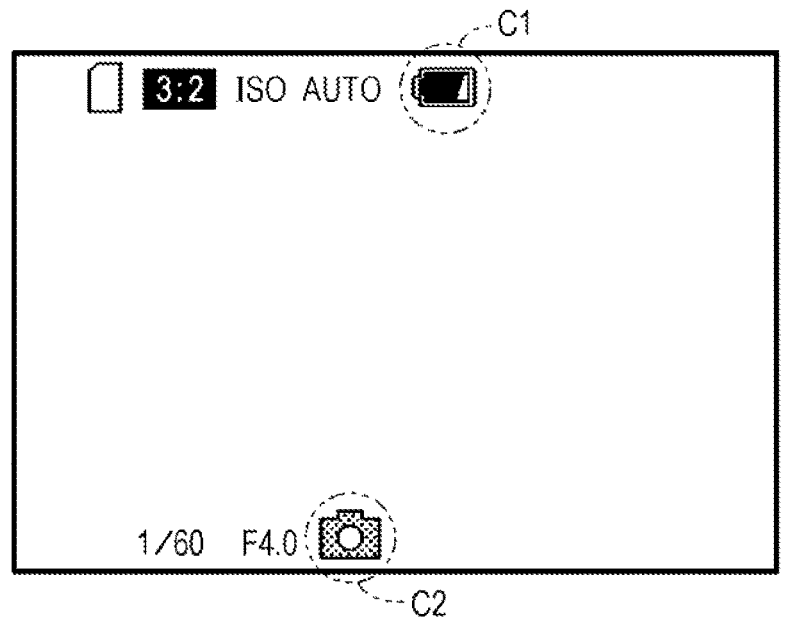
FIG. 5A is an image view illustrating an example of an image displayed on the display unit in a state where a displaying direction of the display unit and an imaging direction of the imaging unit are approximately antiparallel with each other.

FIG. 5A is an image view illustrating an example of the image displayed on the display unit in a state where the displaying direction of the display unit and the imaging direction of the imaging unit are approximately antiparallel with each other.

In a state where the displaying direction of the display unit 13 and the imaging direction of the imaging unit 15 are approximately antiparallel with each other, the photographic object image, obtained by the imaging element, and, for example, one or more of the icons indicating various parameter setting values in use for the photographing are displayed on the display unit 13. FIG. 5A illustrates an example in which the icon C1 indicating the amount of remaining battery power, an icon C2 indicating that the imaging device 1 is in the photographing mode, and the like are displayed on the display unit 13.

Figure 5B:
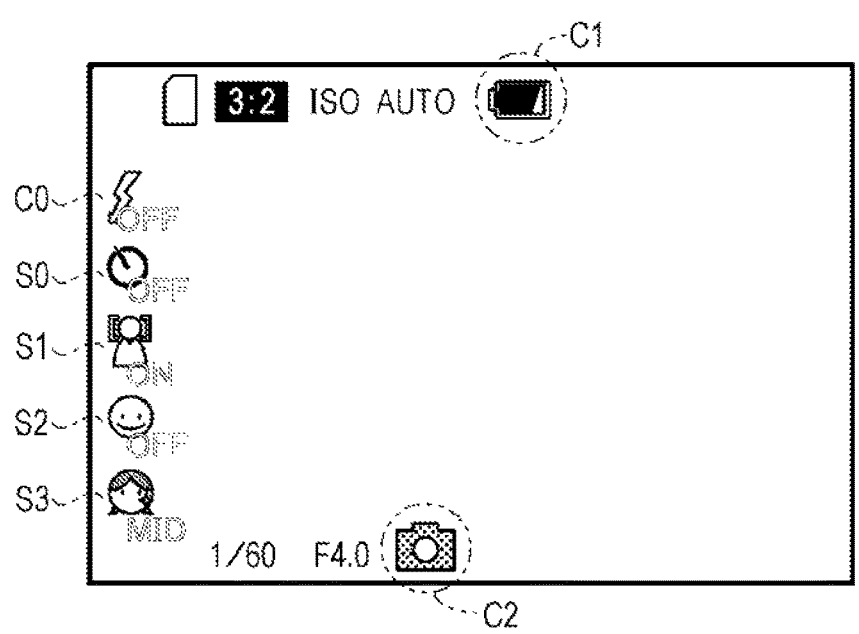
FIG. 5B is an image view illustrating another example of the image displayed on the display unit in a state where the displaying direction of the display unit and the imaging direction of the imaging unit are approximately antiparallel with each other.

FIG. 5B is an image view illustrating another example of the image displayed on the display unit in a state where the displaying direction of the display unit and the imaging direction of the imaging unit are approximately antiparallel with each other.

FIG. 5B illustrates an example in which an icon C0 indicating a stroboscope setting value, an icon S0 indicating a self-timer setting value, an icon S1 indicating a face detection setting value, an icon S2 indicating a "smile shutter" setting value, and an icon S3 indicating a "complexion compensation" setting value are additionally displayed on the display unit 13. In the example illustrated in FIG. 5, light emission by the stroboscope, self-timer and "smile shutter" are in an OFF state and face detection is in an ON state. Furthermore, the extent of the "complexion compensation" is set to "middle." In this manner, the parameter setting value in use for self-portrait photographing and the like may be additionally displayed on the display unit.

As illustrated in FIGS. 5A and 5B, some or all of the icons indicating the various parameter setting values are displayed on the display unit 13. Generally, a display format is made changeable in the imaging device 1 in such a manner that the user may adjust an amount of information relating to the various parameters. That is, for example, the display format as illustrated in FIG. 5A and the display format as illustrated in FIG. 5B may be switched between them in the imaging device 1, by performing the operation on the function button group 61 and the like.

Here, the user makes the imaging surface of the imaging element face toward him/her to perform the photographing in which his/her body is included in the photographic object, in a state where the displaying direction of the display unit and the imaging direction of the imaging unit are approximately antiparallel with each other (the state as illustrated in FIGS. 1A and 1B).

When this is done, because the display surface of the display unit moves to the rear surface side of the imaging device when viewed from the user, the user has to turn the imaging device over this way and that to an upside down position in such a manner as to make the display surface of the display unit face toward him/her, in order to check the various parameter setting values. Furthermore, the function button group used to change the various parameter setting values is generally arranged on the rear surface of the imaging device. Therefore, it is difficult to efficiently use the related imaging device when the various parameter setting values have to changed. In this manner, in a case where the user performs the photographing in which his/her body is included in the photographic object, he/she has to make the imaging surface of the imaging element face toward him/her after setting in advance the various parameter setting values.

So, according to the present disclosure, whether or not the user performs the photographing in which his/her body is included in the photographic object is presumed depending on whether or not the display unit and the imaging unit are positioned in the predetermined arrangement, and the various parameter setting values is made to displayed on the display unit. At this time, the display control device 11 displays, for example, the icon indicating the parameter setting value in use for self-portrait photographing, among one or more of the icons indicating the various parameter setting values, on the display unit 13.

Figure 6A:
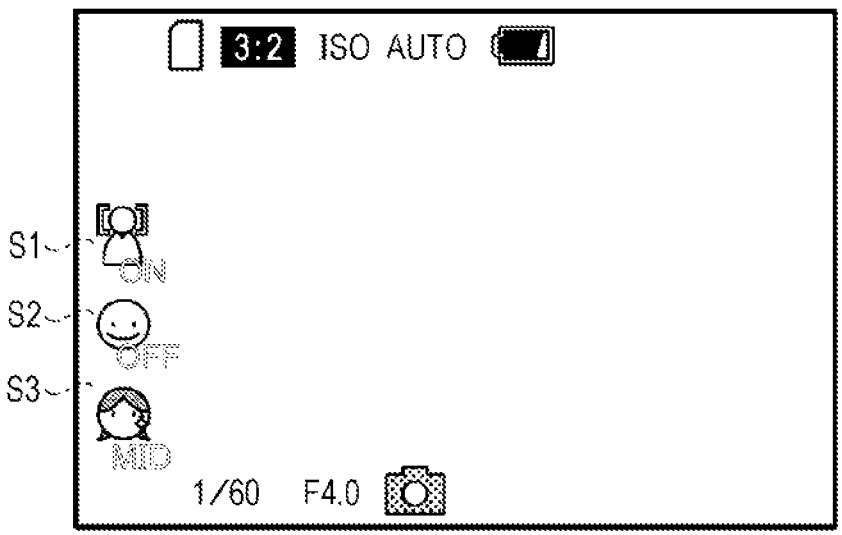
FIG. 6A is an image view illustrating an example of the image displayed on the display unit in a state where the displaying direction of the display unit and the imaging direction of the imaging unit are approximately parallel with each other.

FIG. 6A is an image view illustrating an example of the image displayed on the display unit in a state where the displaying direction of the display unit and the imaging direction of the imaging unit are approximately antiparallel with each other.

According to the present disclosure, the user makes the display surface of the display unit face toward him/her, and the display format of the image displayed on the display unit is automatically changed. That is, when the user, for example, makes the display surface of the display unit face toward him/her, the image displayed on the display suit, for example, transitions to the image illustrated in FIG. 6A.

In a state where the displaying direction of the display unit 13 and the imaging direction of the imaging unit 15 are approximately parallel with each other, the information relating to the processing on the image obtained by the imaging rant 15, for example, is displayed on the display unit 13. For example, the processing relating to the automatic recording of the photographic object image obtained by the imaging unit 15, the processing relating to the compensation of the photographic object image obtained by the imaging unit 15, the processing that detects a specific object from the image obtained by the imaging unit 15, and the like are enumerated as the processing on the image obtained by the imaging unit 15. For example, a setting value of the automatic recording by the self-timer, and a setting value of the automatic recording that is performed according to the result of determining whether or not the photographic object has the smiling face, such as the "smile shutter" are enumerated as the information relating to the automatic recording of the photographic object image obtained by the imaging unit 15. For example, the "complexion compensation" setting value and the like are enumerated as the information relating to the compensation of the photographic object image obtained by the imaging unit 15. For example, the face detection and the like are enumerated as the detection of the specific object from the photographic object image obtained by the imaging unit 15.

More specifically, when the user makes the display surface of the display unit 13 face toward him/her, for example, the icon S1 indicating the face detection setting value, the icon S2 indicating the "smile shutter" setting value, the icon S3 indicating the complexion compensation setting value and the like are displayed on the display unit 13, as illustrated in FIG. 6A. The example is illustrated in FIG. 6A, in which the icon S1 indicating the face detection setting value, the icon S2 indicating the "smile shutter" setting value, and the icon S3 indication the "complexion compensation" setting value are displayed on the display unit 13, but the image displayed on the display unit 13 is not limited to this example. For example, the number, the kind, and the arrangement of the icons displayed on the display unit 13 may be arbitrarily set by the user.

Specifically, the user may check the setting value of the parameter in use for self-portrait photographing without turning the imaging device 1 over this way and that to an upside down position, by displaying the icon indicating the setting value of the parameter in use for the photographing of a person, on the display unit 13. In this manner, in a state where the displaying direction of the display unit 13 and the imaging direction of the imaging unit 15 are approximately parallel with each other, the icon indicating the setting value of the parameter in use for the photographing of the person may be displayed on the display unit 13.

1-2. One Example of Processing in Display Control Device

Figure 6B:
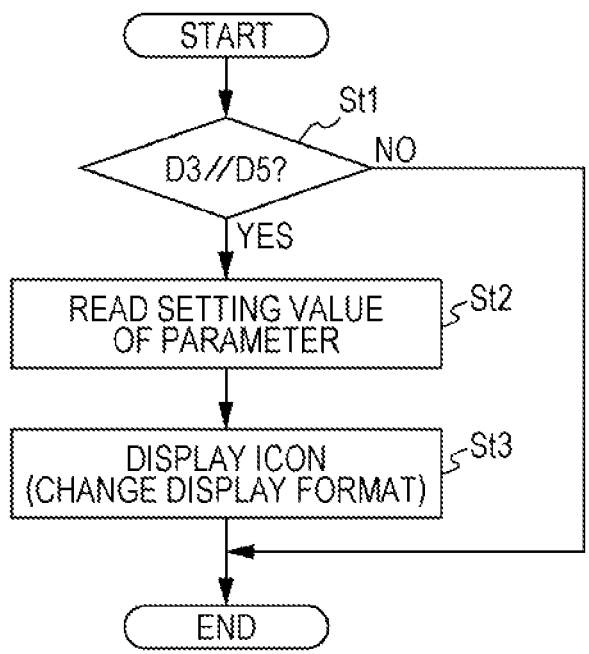
FIG. 6B is a flow chart illustrating one example of processing in the display control device according to the embodiment of the present disclosure.

FIG. 6B is a flow chart illustrating one example of the processing in the display control device according to the embodiment of the present disclosure. A sequence of the processing described below referring to FIG. 6B, for example, is performed by the control unit.

First, it is determined whether or not the display unit 13 and the imaging unit 15 have the predetermined relationship, in Step St1. That is, for example, it is determined whether or not the displaying direction of the display unit 13 and the imaging direction of the imaging unit 15 are approximately parallel with each other, based on the result of the detection by the detection unit 17. In a case where the detection result is that the displaying direction of the display unit 13 and the imaging direction of the imaging unit 15 are not approximately parallel with each other, the processing is ended.

On the other hand, in a case where the result of the detection by the detection unit 17 is that the displaying direction of the display unit 13 and the imaging direction of the imaging unit 15 are approximately parallel with each other, the processing proceeds to Step St2. And the setting value of the parameter in use for the self-portrait parameter is read, for example, in Step St2. The various parameter setting values are stored, for example, in the internal storage device, fixed inside the main body 1b, and the like.

When the reading of the setting value of the parameter ends, the processing proceeds to Step St3. The display format of the image displayed on the display unit 13 is changed in Step St3. That is, for example, the image displayed on the display unit 13 is changed from the image illustrated in FIG. 5A to the image illustrated in FIG. 6A.

At this time, as illustrated in FIG. 6A, the icon according to each setting value is displayed on the display unit 13. Therefore the user may easily check, for example, whether the face detection setting value is in an ON state, whether the "smile shutter" setting value is in an OFF state, and whether the extent of the "complexion compensation," is set to "middle," by referring to each icon displayed on the display unit 13.

In this manner, according to the first embodiment of the present disclosure, the user making the display surface of the display unit 13 face toward him/her automatically changes the display format of the image displayed on the display unit 13.

For example, in a case where the user performs the self-portrait photographing, the display surface of the display unit is made to face toward him/her, but there is a case where the imaging device shakes and thus he/she is not able to perform the photographing well in a state where the display surface of the display unit faces toward him/her. Then, after selecting in advance the setting for the self-portrait photographing on the imaging device, such as the self-timer, the user performs the photographing. In this case, the user has to perform the various settings before changing the displaying direction of the display unit.

In a case where the user performs the various settings before changing the displaying direction of the display unit, there is a case for which he/she wants to check the various parameter values, such as checking whether the photographing using the self-timer is effective, while checking his her image displayed on the display unit. At this time, the user may not conveniently check the various parameter setting values, only by simply making the display surface of the display unit face toward him/her. This is because when the user wants to check the various parameter setting values, he/she, for example, has to call up a display screen on which to display the setting value that is determined as calling up the user's checking, by performing a menu operation and display a format switching operation.

Because of this, in order to perform the switching of the display format in the related imaging device, the user has to operate the button arranged in the rear surface of the imaging device by feel while holding a pose for photographing. Furthermore, the user stops holding that pose to return the displaying direction of the display unit to its original direction, and has to operate the buttons while visually recognizing the buttons arranged in the rear surface of the imaging device.

According to the present disclosure, the detection unit detects whether the user changes the displaying direction of the display unit, and thus, for example, the setting value of the parameter in use for the photographing in which the body of the user operating the imaging device is included in the photographic object displayed on the display unit, according to the result of the detection by the detection unit. Because of this, the user may easily check whether or not the setting value of the parameter in use for photographing corresponds to a setting suitable for the photographing in which his/her body is included in the photographic object, in a state where the display surface of the display unit faces toward him/her. Therefore, according to the present disclosure, the user may easily perform the self-portrait photographing without having to take the trouble of operating the buttons in the rear surface of the imaging device, or of stopping the holding of the pose.

Moreover, an example is illustrated in FIG. 6A, in which the icon indicating the setting value of the parameter in use for self-portrait photographing, among one or more of the icons indicating the various parameter setting values in use for photographing is displayed on the display unit 13, in a case where the user makes the display surface of the display unit 13 face toward him/her. In this manner, the icon indicating the setting value of the parameter in use for self-portrait photographing, among one or more of the icons indicating the various parameter setting values in use for photographing may preferentially be displayed.

The number of the icons displayed on the display unit 13 may be five or less and preferably be three. This is because when the number of the icons displayed on the display unit 13 is great, the user may easily check the setting value of the various parameters, but the screen display is complicated and thus the user has difficulty checking the photographic object image. When the number of the icons displayed on the display unit 13 is approximately three, the image displayed on the display unit 13 is not complicated and as a result, an amount of information may be well balanced.

Moreover, in a case where the user makes the display surface of the display unit 13 face toward him/her, for example, the image displayed on the display unit 13 may, of course, transition from the image illustrated in FIG. 5A to the image illustrated in FIG. 5B. In this manner, the amount of information displayed on the display unit 13 may be adjusted according to the user's demand.

<2. Second Embodiment>

2-1. Outlined Configuration of Imaging Device

Figure 7A:
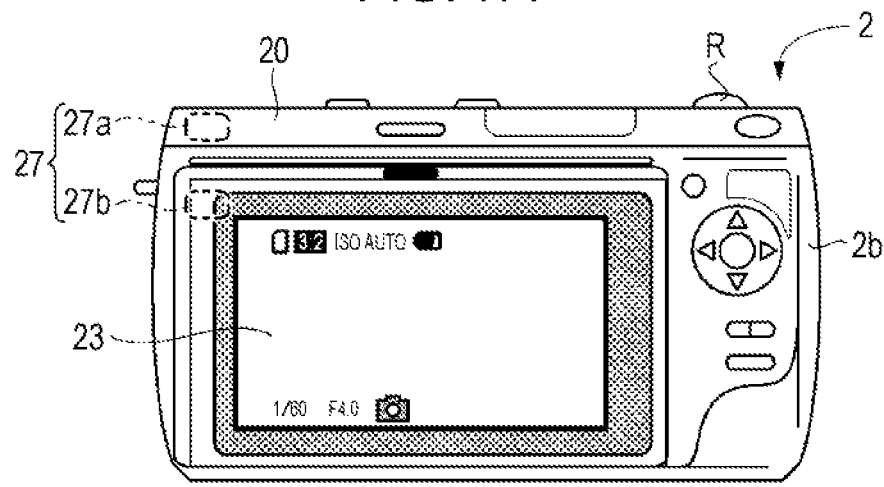
FIG. 7A is a rear view illustrating one example of the imaging device to which the display control device according to a second embodiment is applied.
Figure 7B:
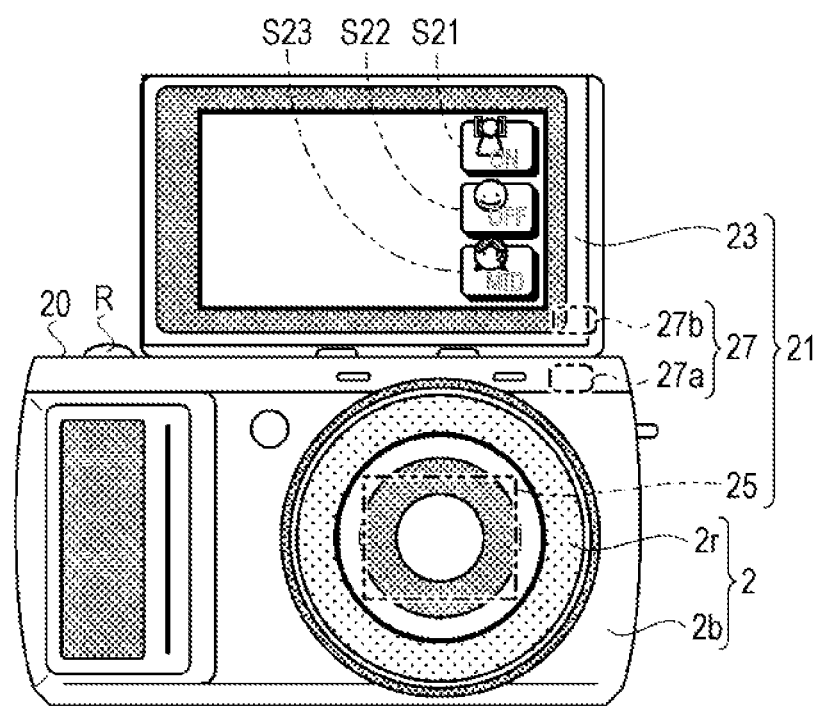
FIG. 7B is a schematic view illustrating a state where the display surface of the display unit of the imaging device illustrated in FIG. 7A faces toward the photographic object.

FIG. 7A is a rear view illustrating one example of the imaging device to which the display control device according to a second embodiment is applied. FIG. 7B is a schematic view illustrating a state where the display surface of the display unit of the imaging device illustrated in FIG. 7A faces toward the photographic object.

As illustrated in FIGS. 7A and 7B, an imaging device 2 to which a display control device 21 according to the second embodiment, for example is applied, is configured from a main body 2b, and a lens unit 2r. What the imaging device 2 according to the second embodiment and the imaging device 1 according to the first embodiment have in common is that an imaging unit 25 including an image element is arranged inside a housing 20 of the main body 2b, and for example, a function button group and a display unit 23 are arranged in the rear surface of the main body 2b of the imaging device 2. Furthermore, what the second embodiment and the first embodiment have in common is that at least one of an item of information relating to automatic recording of a photographic object image obtained by the imaging unit 25 and an item of information relating to compensation of the photographic object image obtained by the imaging unit 25 are displayed on the display unit 23 according to a result of detection by a detection unit 27.

The second embodiment is different from the first embodiment in that the display unit 23 includes a function of an input device receiving an instruction from a user performs. That is, the display unit 23 according to the second embodiment is configured specifically from a touch panel and as a result, the display unit 23 has also the function of an operating unit 63 described above.

According to the second embodiment, for example, one or more icons indicating setting values of parameters in use for self-portrait photographing are displayed on the display unit 23 according to a result of detection by the detection unit 27. The second embodiment is different from the first embodiment in that the user touching the icon display on the display unit 23 performs a function dependent on content indicated by each icon.

2-2. Outline of Operation of Imaging Device

As illustrated in FIG. 7A, in a state where the displaying direction of the display unit 23 and the imaging direction of the imaging unit 25 are approximately antiparallel with each other, for example, the photographic object image, obtained by the imaging element, and one or more of the icons indicating various parameter setting values are displayed on the display unit 23. Furthermore, for example, the setting value of the parameter in use for the photographing in which the user operating the imaging device 2 includes his/her body in the photographic object and the like are additionally displayed on the display unit 23.

Here, the rotation by the user of the display surface of the display unit 23 with respect to the housing 20 determines that the detection unit 27, for example, configured from a set of a magnetic field sensor 27a and a magnet 27b, detects that the display unit 23 and the imaging unit 25 have a predetermined relationship. When this is done, the display format of the display unit 23 is changed like in a case of the first embodiment, and information relating to automatic recording of the photographic object image obtained by the imaging unit 25 or information relating to compensation of the photographic object image is displayed on the display unit 23. Specifically, for example, an icon S21 indicating a face detection setting value, an icon S22 indicating a "smile shutter" setting value, an icon S23 indicating a "complexion compensation" setting value and the like are displayed on the display unit 23, as illustrated in FIG. 7B.

As illustrated above, according to the second embodiment, the display unit 23 is configured from a touch panel. In the display control device 21 according to the second embodiment, when the touch by the user of the icons S21 to S23 displayed on the display unit 23 is detected, the screen displayed on the display unit 23, for example, transitions to the screen for changing the parameter setting value indicated by the individual icon. Therefore, the user may change the setting corresponding to the processing indicated by each of the icons S21 to S23, by touching each of the icons S21 to S23 displayed by the display unit 23, at the time of self-portrait photographing.

Moreover, for example, the user performing a so-called "flick" operation and tracing operation may enable icons, different from one or more of the icons that are first displayed on the display unit 23 by making the display surface of the display unit 23 face toward the user, to appear on the display unit 23. For example, the user tracing downward an area around the icons S21 to S23 displayed on the display unit 23 may cause the icon S21 to S23 to flow downward. In this case, the user performing the tracing operation, for example, enables the icon S23 indicating the "complexion compensation" setting value to hide below the screen, and for example, enables the icon indicating the self-timer setting value to appear from above the screen. By doing this, the user may easily change the setting values of the various parameters in use for photographing.

Figure 8A:
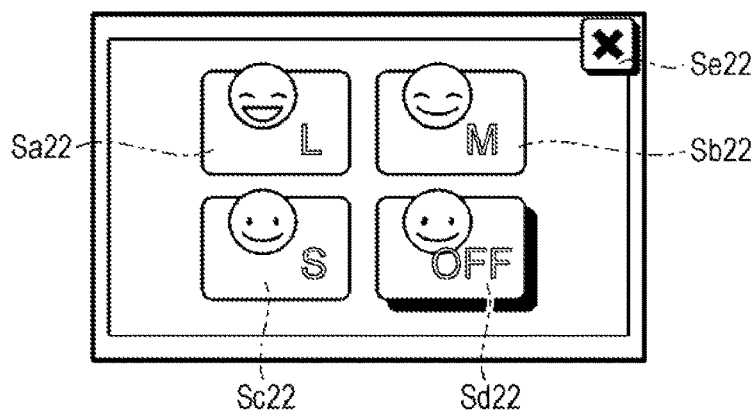
FIG. 8A is an image view illustrating an example of a setting screen that is displayed when a user touches an icon displayed on the display unit.

FIG. 8A is an image view illustrating an example of a setting screen that is displayed when the user touches the icon displayed on the display unit.

FIG. 8A is a view illustrating what appears after the user touches the icon S22 displayed on the display unit 23. When the user touches the icon S22 displayed on the display unit 23, the screen displayed on the display unit 23, for example, transitions to the screen for changing the setting corresponding to the processing indicated by the icon S22, as illustrated in FIG. 8A.

FIG. 8A illustrates a state in which an icon Sa22 for determining the "smile shutter" setting value" as a "broad smile," an icon Sb22 for determining the setting value" as a "usual smile," an icon Sc22 for determining the setting value as a "thin smile," an icon Sd22 for determining the setting value as an OFF state, and an icon Se22 for closing the setting screen are displayed. The user, for example, may switch the setting value of the processing indicated by the icon S22, that is, the "smile shutter" setting value, by touching any one of the icons Sa22, Sb22, Sc22, and Sd22.

FIG. 8A illustrates a state in which the "OFF" state is selected as the "smile shutter" setting value. For example, after selecting the OFF state for the "smile shutter" setting value, the user touching the icon Se22 for closing the setting screen saves the "smile shutter" setting value as the OFF state and closes the setting screen.

Moreover, when the touching, by the user, of the icons S21 to S23 is detected, the screen displayed on the display unit 23 may transition to the setting screen, and additionally the setting corresponding to the processing indicated by the individual icon may be changed. That is, the user touching the icon S23 among the icons S21 to S23 displayed on the display unit 23 may switch the "complexion compensation" setting value in the following sequence: OFF state, "weak," "middle," "strong," OFF state and so forth. In this case, the user may change the setting value of the processing indicated by the icon S23, that is, the "complexion compensation" setting value, for example, by repeatedly touching the icon S23.

2-3. One Example of Processing in Display Control Device

Figure 8B:
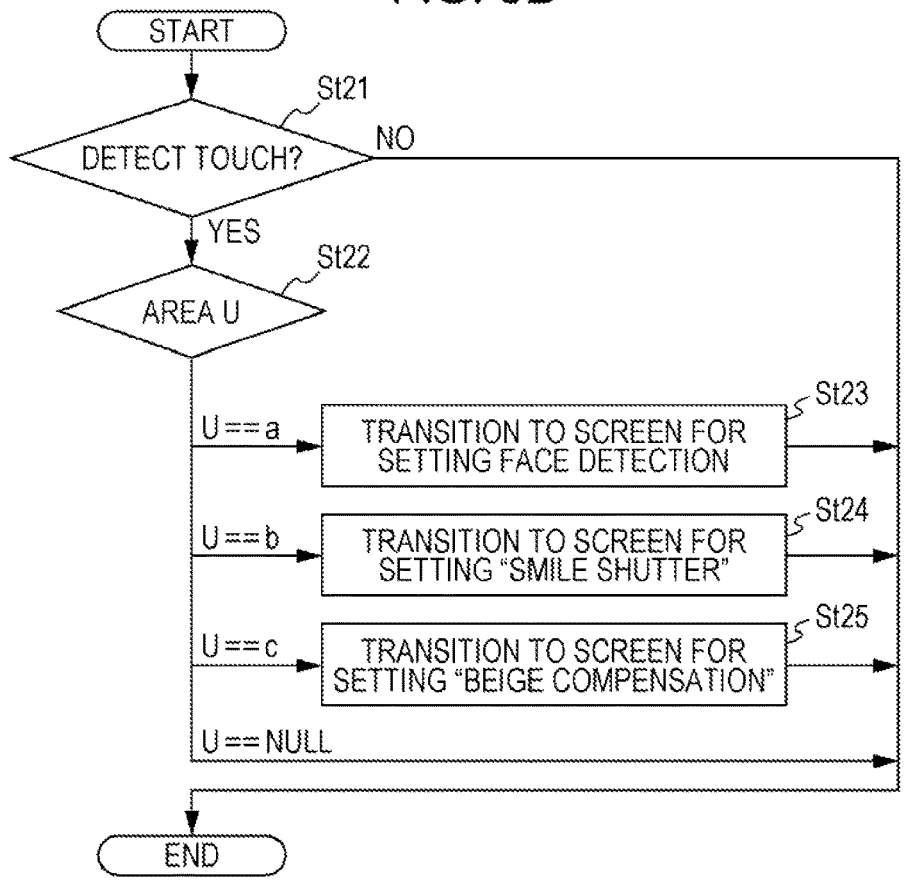
FIG. 8B is a flow chart illustrating one example of the processing that is performed by touching the icon displayed on the display unit.

FIG. 8B is a flow chart illustrating one example of the processing that is performed by touching the icon displayed on the display unit. In FIG. 8B, the display unit 23 and the imaging unit 25 are defined as having the predetermined relationship. A sequence of the processing described below referring to FIG. 8B, for example, is performed by the control unit.

First, it is determined whether or not the user touches the display unit 23 that is configured from the touch panel, in Step St21. In a case where it is not detected that the user touches the display unit 23, the processing is ended.

On the other hand, in a case where it is detected that the user touches the display unit 23 by the detection unit 27, the processing proceeds to Step St22. As a result of detecting whether which of the areas displayed on the display unit 23 the user touches is determined in Step St22. That is, it is determined which of the icons S21 to S23 displayed on the display unit 23 the user touches. It is assumed below that a variable designating an area (may be referred to as coordinates) on which each of the icons S21 to S23 is displayed is defined as U, and "a," "b," and "c," as values of the variables, are assigned to areas on to which the icons S21, S22, and S23 are displayed, respectively.

For example, in a case where the user touches the icon S21 displayed on the display unit 23, the screen displayed on the display unit 23 transitions to the screen for changing the face detection setting in Step St23. For example, in a case where the user touches the icon S22 displayed on the display unit 23, the screen displayed on the display unit 23 transitions to the screen for changing the smile shutter setting, in Step St24.

Furthermore, for example, in a case where the user touches the icon S23 displayed on the display unit 23, the screen displayed on the display unit 23 transitions to the screen for changing the "complexion compensation" setting, in Step St25. Moreover, in a case where the user touches an area that is positioned away from the areas on which the icons S21 to S23 are displayed (in a case, illustrated in FIG. 9B, where U==NULL), the processing is ended.

2-4. Arrangement of Icons

One or more of the icons, which are displayed on the display unit 23 by making the display surface of the display unit 23 face toward the user, for example, may be arranged on an area that is positioned away from a release button R when viewed from the user. The user, for example, may operate the release button R in the imaging device 2 with his/her left hand and may operate the icon displayed on the display unit 23 with his/her right hand. At this time, the finger or hand of the user who intends to touch the display unit 23 may not block light that is incident on the imaging unit 25.

Figure 9A:
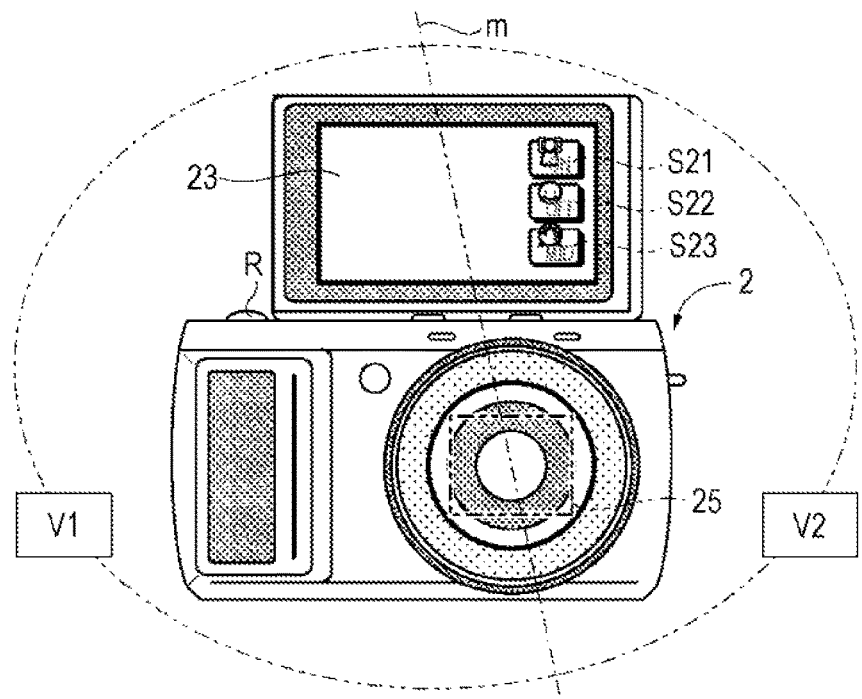
FIG. 9A is a view illustrating a preferable arrangement of one or more of the icons displayed on the display unit.

FIG. 9A is a view illustrating the preferable arrangement of one or more of the icons displayed on the display unit.

Figure 9B:
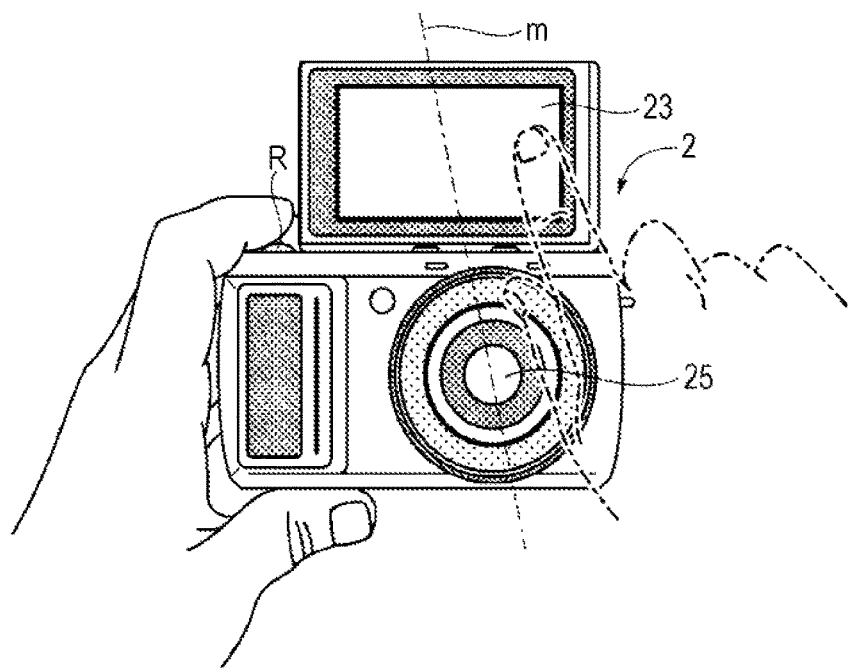
FIG. 9B is a schematic view illustrating a relative positional relationship between the user's hand and the imaging device at the time of self-portrait photographing.

FIG. 9B is a schematic view illustrating the relative positional relationship between the user's hand and the imaging device at the time of self-portrait photographing.

As illustrated hi FIG. 9A, it is assumed that a straight line m passes along the center of the screen of the display unit 23 and the center of the imaging unit 25. The corresponding straight line m is indicated by a dashed dotted line in FIG. 9A. As illustrated in FIG. 9A, a certain area is assumed to include the imaging device 2. The area including the imaging device 2 is indicated by a two dot chain line in FIG. 9A.

Here, it is assumed that the area including the imaging device 2 is divided into an area V1 and an area V2 by the straight line m. At this time, one or more of the icons, which are displayed on the display unit by making the display surface of the display unit 23 face toward the user, for example, may be arranged on a part in an area on the side, not including the release button R, of the display surface of the display unit 23. Specifically, for example, the icons S21 to S23 may be displayed on a part in the area V2 on the side, not including the release button R, of the display surface of the display unit 23.

The reason that one or more of the icons are displayed at a position that is relatively away from the release button R is because that the hand of the user who intends to touch the display unit 23 prevents light incident on the imaging unit 25 from being blocked, as illustrated in FIG. 9B.

Moreover, an arrangement of one or more of the icons may be relatively positioned away from the release button R, and all of one or more of the icons may not be necessarily displayed on the area V2 on the side not including the release button R.

For example, all or some of one or more of the icons may be displayed at a position that is further away from the release button R than the center of the screen of the display unit 23. Furthermore, for example, when it is assumed that the screen is to be divided into two parts in a case where the screen of the display unit 23 is rectangular, all or some of one or more of the icons maybe displayed on one part, relatively away from the release button R, of the two parts. An upper and lower bisection, a left and right bisection, and a diagonal bisection, for example, are enumerated as a screen-division technique. For example, when one or more of the icons are displayed on the right side in a case where the release button R is positioned on the left side when viewed from the user, at the time of self-portrait photographing, the user easily operates one or more of the icons with his/her right hand.

In this manner, the arrangement of one or more of the icons displayed on the display unit 23 may be suitably adjusted by the arrangement of the display unit 23 with respect to the housing 20 of the main body 2b and the arrangement of the imaging unit 25, or by the direction in which the user holds the imaging device 2 at the time of self-portrait photographing or the like.

According to the second embodiment of the present disclosure, the user making the display surface of the display unit 23 face toward him/her automatically changes the display format of the image displayed on the display unit 23. Because of this, the user may easily check the setting values of the parameters in use for sell-portrait photographing. Furthermore, according to the second embodiment, the user may individually change the setting values of the parameters that are indicated by the icons displayed on the display unit 23, by touching one or more of the icons displayed on the display unit 23. Because of this, the user may easily change the setting values of the parameters in use for self-portrait photographing while checking the photographic object image displayed on the display unit 23 without taking the trouble of displaying the menu screen.

<3. Third Embodiment>

3-1. Outlined Configuration of Imaging Device

Figure 10A:
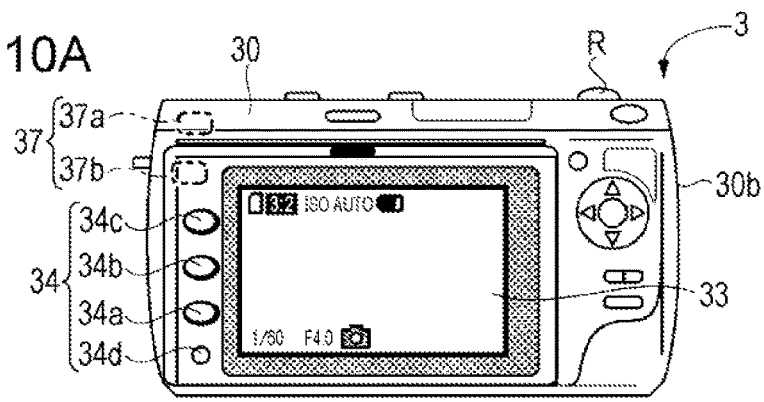
FIG. 10A is a rear view illustrating one example of the imaging device to which the display control device according to a third embodiment is applied.
Figure 10B:
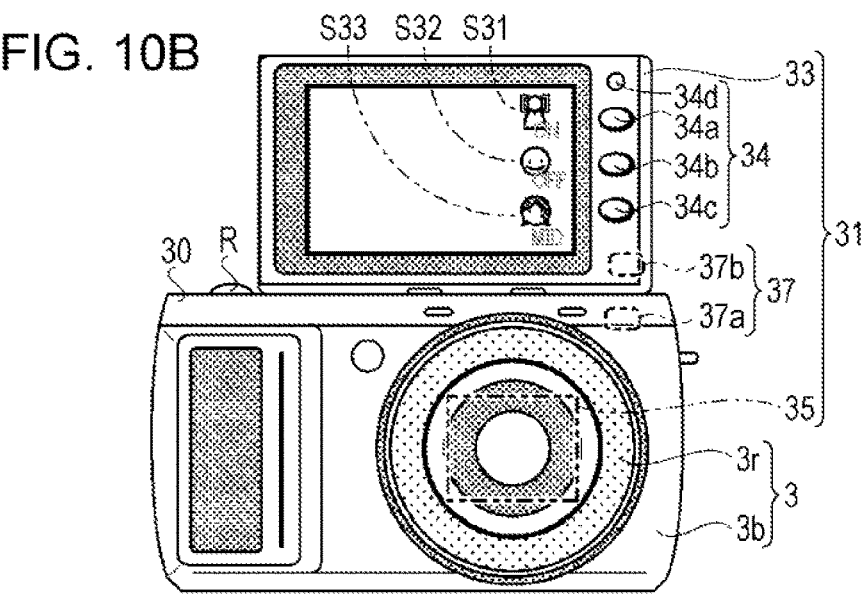
FIG. 10B is a schematic view illustrating a state where the display surface of the display unit of the imaging device illustrated in FIG. 10A faces toward the photographic object.

FIG. 10A is a rear view illustrating one example of the imaging device to which the display control device according to a third embodiment is applied. FIG. 10B is a schematic view illustrating a state where the display surface of the display unit of the imaging device illustrated in FIG. 10A faces toward the photographic object.

As illustrated in FIGS. 10A and 10B, an imaging device 3 to which a display control device 31 according to the third embodiment is applied, for example, is configured from a main body 3b, and a lens unit 3r. What the imaging device 3 according to the third embodiment and the imaging device 1 according to the first embodiment have in common is that an imaging unit 35 including an image element is arranged inside a housing 30 of the main body 3b, and for example, a function button group and a display unit 33 are arranged in the rear surface of the main body 3b of the imaging device 3. Furthermore, what the third embodiment and the first embodiment have in common is that information relating to automatic recording of a photographic object image obtained by the imaging unit 35 or information relating to the compensation of the photographic object image is displayed on the display unit 33, according to a result of detection by a detection unit 37.

The third embodiment is different from the first embodiment in that the display unit 33 is determined as a display unit having one or more function buttons 34. The third embodiment is different from the first embodiment in that a function according to information relating to processing on an image obtained by the imaging unit 35 is assigned to each of one or more of the function buttons 34 arranged in the display unit 33 according to the result of the detection by the detection unit 37.

3-2. Outline of Operation of Imaging Device

Four function buttons 34a to 34d are arranged in the display unit 33 in the example in FIG. 10A. In a state where the displaying direction of the display unit 33 and the imaging direction of the imaging unit 35 are approximately antiparallel with each other, for example, functions such as a menu operation and a selection of a photographing mode that fits with a scene are assigned to the function buttons 34a to 34d as is the case with the function button group in the rear surface of the housing 30.

Here, the rotation by the user of the display surface of the display unit 33 with respect to the housing 30 determines that the detection unit 37, for example, configured from a set of a magnetic field sensor 37a and a magnet 37b, detects that the display unit 33 and the imaging unit 35 have a predetermined relationship. When this is done, a display format of the display unit 33 is changed like in a case of the first embodiment, and information relating to processing on an image obtained by the imaging unit 35 is displayed on the display unit 33. Specifically, for example, an icon S31 indicating a face detection setting value, an icon S32 indicating a "smile shutter" setting value, an icon S33 indicating a "complexion compensation" setting value and the like are displayed on the display unit 33, as illustrated in FIG. 10B. At this time, the icons S31 to S33 are displayed in the vicinity of the function buttons 34a to 34c, respectively.

According to the third embodiment, the display format of the display unit 33 is changed, and additionally the functions realized by performing the operation on the function buttons 34a to 34c arranged in the display unit 33 are changed to the functions relating to the setting of the parameter setting values in use for self-portrait photographing. In other words, according to the third embodiment, the functions for changing the setting corresponding to the processing on the image obtained by the imaging unit 35 are assigned to the function buttons 34a to 34c, respectively, according to the result of the detection by the detection unit 37. Therefore, the user may change the setting corresponding to the processing indicated by each of the icons S31 to S33, by pushing each of the buttons 34a to 34c, at the time of self-portrait photographing.

Moreover, the function buttons 34a to 34d may be arranged at a position that is relatively away from a release button R.

For example, when the function buttons 34a to 34d are arranged on the right side of the screen in a case where the release button R is positioned on the left side when viewed from the user, at the time of self-portrait photographing, the user easily operates the function buttons 34a to 34d with his/her right hand.

Figure 10C:
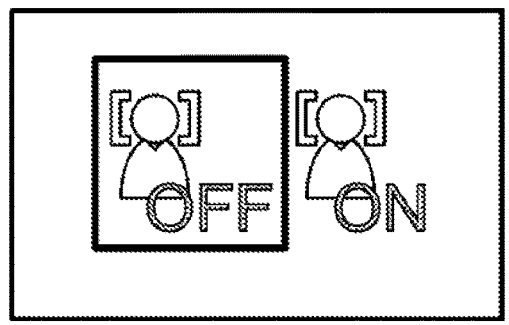
FIG. 10C is an image view illustrating an example of the setting screen that is displayed when a function button displayed on the display unit is pushed down.

FIG. 10C is an image view illustrating an example of a setting screen that is displayed when the function button displayed on the display unit is pushed down.

FIG. 10C is a view illustrating a state in which the function button 34a is pushed down by the user. When the user pushes down the function button S34a, as illustrated in FIG. 10C, for example, the screen displayed on the display unit 33 transitions to the screen for changing the setting corresponding to the processing indicated by the icon S31. For example, the user may switch the setting value of the processing indicated by the icon S31, that is, an ON or OFF state of the face detection by repeatedly pushing down the function button 34a.

Moreover, FIG. 10C illustrates a state in which the "OFF" state is selected as the face detection setting value. For example, after selecting the OFF state as the face detection setting value, the user pushing down the function button 34d saves the face detection setting and closes the setting screen. Otherwise, for example, after the OFF state is selected by the user, as the face detection setting value, the face detection setting is determined as the OFF state and the setting screen is closed when a definite period of time elapses.

3-3. One Example of Processing in Display Control Device

Figure 11A:
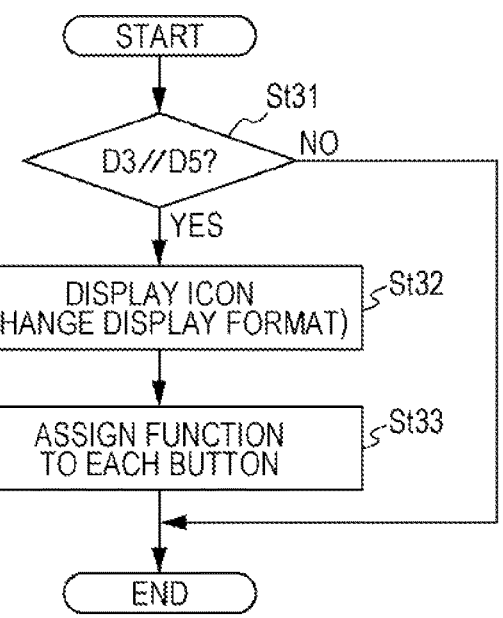
FIG. 11A is a flow chart illustrating one example of the processing that assigns the functions to function buttons arranged in the display unit.

FIG. 11A is a flow chart illustrating one example of the processing that assigns the functions to the function buttons arranged in the display unit. A sequence of the processing described below referring to FIG. 11A, for example, is performed by the control unit.

First, it is determined whether or not the display unit 33 and the imaging unit 35 have the predetermined relationship, in Step St31. That is, for example, it is determined whether or not the displaying direction of the display unit 33 and the imaging direction of the imaging unit 35 are approximately parallel with each other, based on the result of the detection by the detection unit 37. In a case where the detection result is that the displaying direction of the display unit 33 and the imaging direction of the imaging unit 35 are not approximately parallel with each other, the processing is ended.

On the other hand, in a case where the result of the detection by the detection unit 37 is that the displaying direction of the display unit 33 and the imaging direction of the imaging unit 35 are approximately parallel with each other, the processing proceeds to Step St32. And the display format of the display unit 33 is changed, and, for example, the icons S31 to S33 indicating the parameter setting values are displayed on the display unit 33, in Step St32.

When the changing of the display format of the display unit 33 is ended, the processing proceeds to Step St33. The functions for changing the settings indicated by the icons S31 to S33 displayed on the display unit 33 are assigned to operations on the function buttons 34a to 34c, respectively, in Step St33.

Specifically, for example, the function for switching ON and OFF states of the face detection is assigned to the function button 34a at a position near the icon S31 indicating the face detection setting value. For example, the function for switching a "smile shutter" setting value is assigned to the function button 34b at a position near the icon S32 indicating the "smile shutter" setting value. Furthermore, for example, the function for switching a "complexion compensation" extent setting value is assigned to the function button 34c at a position near the icon S33 indicating the "complexion compensation" setting value. Moreover, since the icons S31 to S33 are displayed in the vicinity of the function buttons 34a to 34c, respectively, the user may easily recognize whether which function is assigned to which button.

Figure 11B:
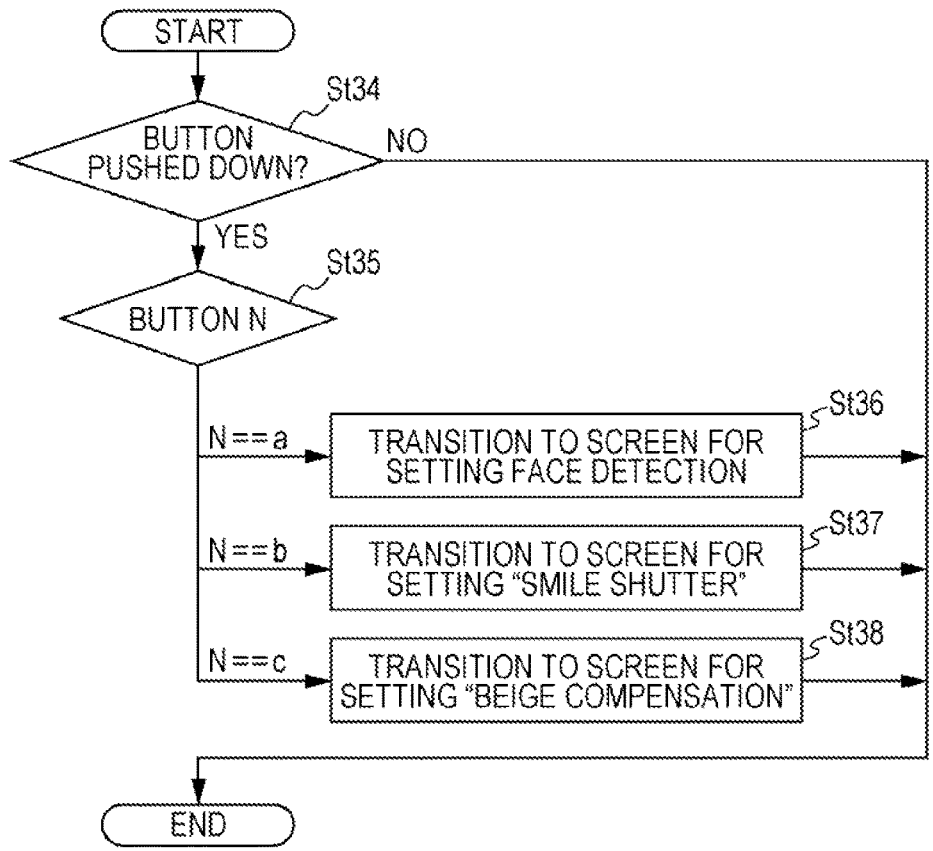
FIG. 11B is a flow chart illustrating one example of the processing on operations of the function buttons arranged in the display unit.

FIG. 11B is a flow chart illustrating one example of the processing on the operations of the function buttons arranged in the display unit. A sequence of the processing described below referring to FIG. 11B, for example, is performed by the control unit.

First, it is determined whether or not which of the function buttons 34a to 34c at positions near the icons S31 to S33 displayed on the display unit 33 is pushed down, in Step St 34. In a case where the function buttons 34a to 34c arranged on the display unit 33 are not pushed down, the processing is ended.

Next, it is determined whether or not which of the function buttons 34a to 34c arranged in the display unit 33 is pushed down, in Step St35. It is assumed below that a variable designating each of the function buttons 34a to 34c is defined as N, and "a," "b," and "c," as values of the variables, are assigned to the function buttons 34a, 34b, and 34c, respectively.

For example, in a case where the user pushes down the function button 34a, the screen displayed on the display unit 33 transitions to the screen for changing the face detection setting in Step St36. For example, in a case where the user pushes down the function button 34b, the screen displayed on the display unit 33 transitions to the screen for changing the "smile shutter" setting in Step St37. For example, in a case where the user pushes down the function button 34c, the screen displayed on the display unit 33 transitions to the screen for changing the "complexion compensation" setting in Step St38.

According to the third embodiment of the present disclosure, the user making the display surface of the display unit 33 face toward him/her automatically changes the display format of the image displayed on the display unit 33. Because of this, the user may easily check the setting values of the parameters in use for self-portrait photographing. Furthermore, according to the third embodiment, the functions for changing the settings indicated by one or more of the icons displayed on the display unit 33 are assigned to one or more of the function buttons arranged in the display unit 33 in which the display surface faces the user at the time of self-portrait photographing, respectively. Because of this, the user may easily change the setting values of the various parameters in use for photographing, while checking the photographic object image displayed on the display unit 33, without changing hands to hold the imaging device 3 in order to operate the function buttons arranged in the rear surface of file imaging device 3.

<4. Modification Examples>

The preferred embodiments are described above, but the preferred embodiments are not limited to the examples described above and various modifications thereto may be made.

According to the embodiments described above, the example in which the display unit has the free rotational movement with respect to the housing of the main body is illustrated, but the manner in which the display unit is connected to the housing of the main body is not limited thereto.

Figure 12A:
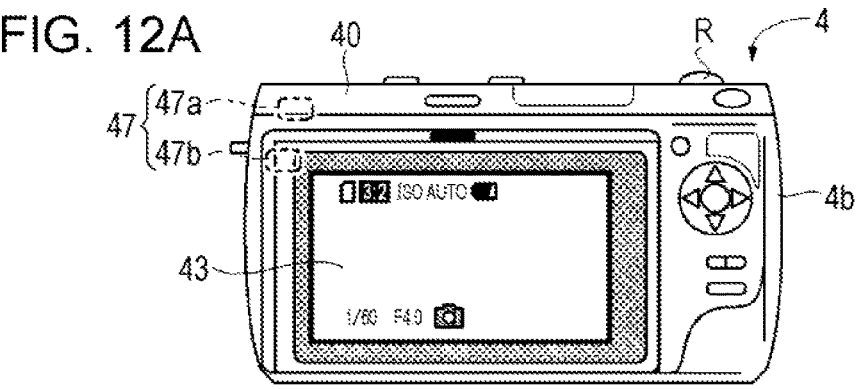
FIG. 12A is a schematic view illustrating another embodiment in which the display unit is connected to the housing of the main body.
Figure 12B:
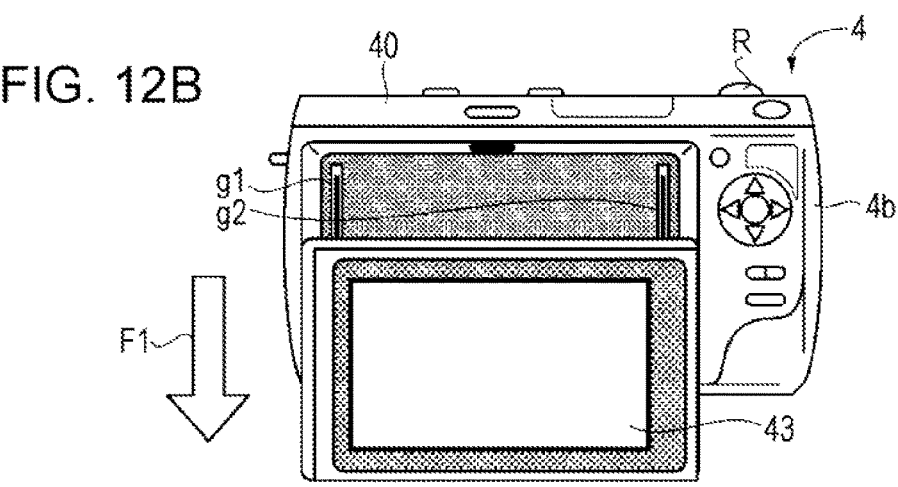
FIG. 12B is a schematic view illustrating another embodiment in which the display unit is connected to the housing of the main body.
Figure 12C:
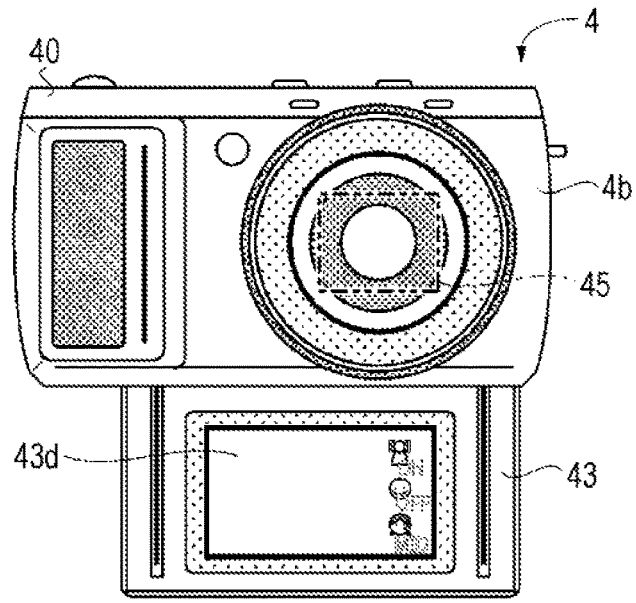
FIG. 12C is a schematic view illustrating another embodiment in which the display unit is connected to the housing of the main body.

FIGS. 12A to 12C and FIGS. 13A to 13C are schematic views each illustrating another embodiment in which the display unit is connected to the housing of the main body. FIGS. 12A and 12B are views each illustrating the rear surface of the imaging device 4 to which the display control device according to the embodiment of the present disclosure is applied. FIG. 12C is a view illustrating the front surface of the imaging device 4 illustrated in FIGS. 12A and 12B.

As illustrated in FIG. 12A, in a state where the displaying direction of the display unit 43 and the imaging direction of the imaging unit 45 are approximately antiparallel with each other, for example, the photographic object image and one or more of the icons indicating the various parameter setting values in use for photographing are displayed on the display unit 43.

The display unit 43 of the imaging device 4 is configured from a slide type panel. As illustrated by the arrow F1 in FIG. 12B, the display unit 43 is supported by rails g1 and g2 arranged in the housing 40 of the main body 4b and has a free sliding movement with respect to the housing 40 of the main body 4b in the downward direction.

A state is illustrated in FIG. 12C, in which the display surface of the display unit 43 is made to face toward the user by sliding the display unit 43 with respect to the housing 40 of the main body 4b in the downward direction. As illustrated in FIG. 12C, the display unit 43, for example, includes a main screen that is positioned in the rear surface side of the imaging device 4 and additionally a sub screen 43d that is positioned in the front surface side of the imaging device 4.

For example, a detection unit 47, configured from a set of a magnetic field sensor 47a and a magnet 47b, is determined as detecting whether the display unit 43 and the imaging unit 45 have the predetermined relationship. When this is done, for example, one or more of the icons indicating the setting values of the parameters in use for self-portrait photographing are displayed on the sub screen 43d. That is, the detection unit 43 detects whether or not the detection unit 47 and the imaging unit 45 are made arranged in such a manner that the display unit 43 is moved with respect to the housing 40 of the main body 4b, and thus the sub screen 43d faces toward the user.

Furthermore, for example, the display unit is made to have the free sliding movement, and may be made to have a free rotational movement, with respect to the housing of the main body.

Figure 13A:
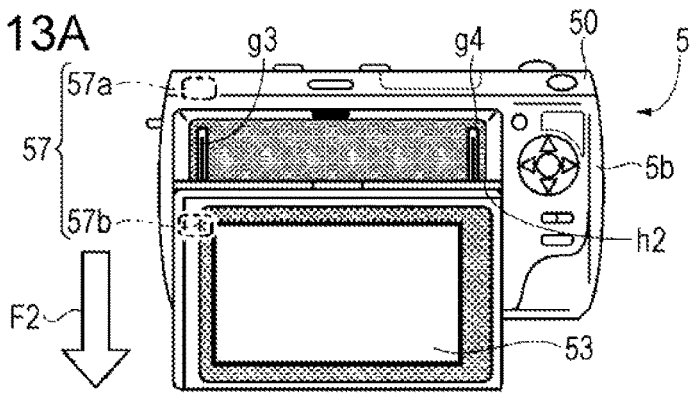
FIG. 13A is a schematic view illustrating another embodiment in which the display unit is connected to the housing of the main body.
Figure 13B:
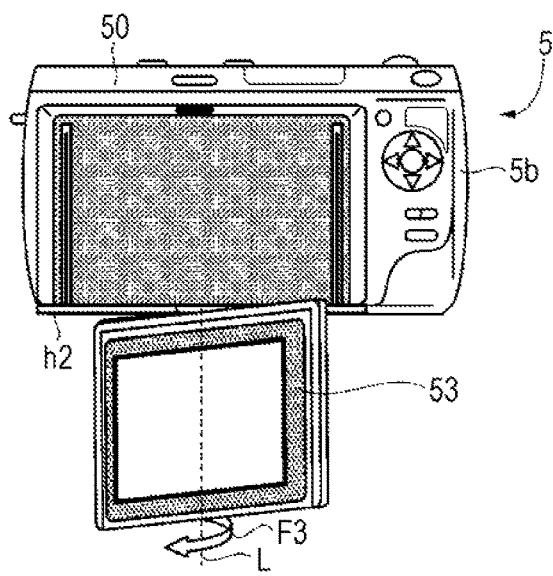
FIG. 13B is a schematic view illustrating another embodiment in which the display unit is connected to the housing of the main body.
Figure 13C:
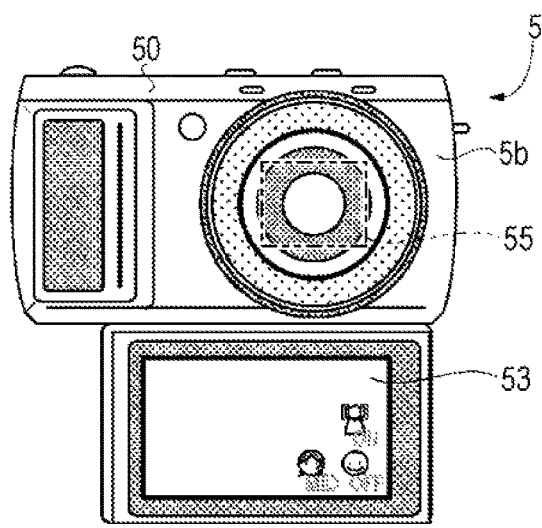
FIG. 13C is a schematic view illustrating another embodiment in which the display unit is connected to the housing of the main body.

FIGS. 13A and 13B are views, each illustrating the rear surface of the imaging device 5 to which the display control device according to the embodiment of the present disclosure is applied. FIG. 13C is a view illustrating the first surface of the imaging device 5 illustrated in FIGS. 13A and 13B.

FIG. 13A illustrates an example in which a hinge portion h2 connecting a housing 50 of a main body 5b and a display unit 53 is slidably supported by rails g3 and g4 arranged in the housing 50 of the main body 5b, and the display unit 53 has the free rotational movement with respect to the hinge portion h2. That is, as indicated by the arrow F2 in FIG. 13A, the user may slide the display unit 53 and the hinge portion h2 with respect to the housing 50 of the main body 5b in the downward direction. Furthermore, as indicated by the arrow F3 in FIG. 13B, the user may rotate the display unit 53 with respect to the hinge portion h2, with an axis L indicated by a dashed line F3 in FIG. 13B being a rotational axis.

A state is illustrated in FIG. 13C, in which the display surface of the display unit 53 is made to face toward the user by rotating the display unit 53 with respect to the housing 50 of the main body 5b in the downward direction and rotating the display unit 53 with respect to the hinge portion h2. For example, a detection unit 57, configured from a set of a magnetic field sensor 57a and a magnet 57b, is determined as detecting that the display unit 53 and the imaging unit 55 have the predetermined relationship. When this is done, also in this case, one or more of the icons indicating the setting values of the parameters in use for self-portrait photographing, for example, are displayed on the display unit 53.

According to the embodiments described above, the example in which the display unit appears above or below the main body in the state where the display surface of the display unit is made to face toward the photographic object, but the display unit may be made to appear to the lateral side of the main body.

According to the present disclosure, there is no particular limitation to the manner in which the connection is made between the imaging unit and the display unit, and as long as the detection unit is able to detect a final state of one of the imaging unit and the display unit with respect to the other, any connection manner may be permitted. In this manner, the user may perform the automatic photographing and the like without taking the trouble of frequently using his/her hand by detecting whether or not the display unit and the imaging unit have the predetermined relationship.

Furthermore, according to the embodiment described above, the example is illustrated in which one or more of the icons indicating the setting values of the parameters in use for photographing are displayed when the display unit and the imaging unit have the predetermined relationship, but whether or not a person is included in the photographic object may further be determined. For example, in a case where whether or not the person is included in the photographic object is further determined, the display unit and the imaging unit have the predetermined relationship and additionally the person is included in the photographic object, one or more of the icons indicating the setting values in use for self-portrait photographing may be made displayed on the display unit.

The operability of the imaging device to which the display control device according to the present disclosure is applied may further be improved, by changing the kinds of parameters of which the values are displayed on the display unit, depending on whether the user intends to photograph a scene or a person as the photographic object.

The present disclosure may be applied not only to the still image photographing, but also to moving image photographing.

According to the embodiment described above, the example is illustrated in which the imaging device includes the display control device, but the application of the display control device is not limited to that example. The display control device according to the present disclosure may be applied to all electronic devices as long as they include the display unit that has free movement with respect to the housing including the imaging unit. For example, the present disclosure may be applied to a mobile phone, a smartphone, a digital book, an audio player, a personal computer (a tablet type, a laptop type, and a desktop type), a personal digital assistant (PDA), an electronic notebook, a web camera, a video game machine and the like.

Furthermore, the configuration, the method, the form and the numerical value that are enumerated according to the embodiment described above are taken only as an example, and a configuration, a method, a form and an numerical value each of which is different from that mentioned above may be used if necessary. The configuration, the method, the form, and the numerical values may be combined with each other within the scope not deviating from the gist of the present disclosure.

For example, the present disclosure may include the following configurations.

(1) A display control device including a detection unit that detects whether or not a display unit and an imaging unit have a predetermined relationship, wherein information relating to automatic recording of a photographic object image obtained by the imaging unit is displayed on the display unit according to a result of detection by the detection unit.

(2) The display control device according to (1), in which the automatic recording is automatic recording by a self-timer.

(3) The display control device according to (1), in which the automatic recording is automatic recording in which recording of an image is performed according to a result of determining whether or not a photographic object has a smiling face.

(4) The device control apparatus according to any one of (1) to (3), in which the predetermined relationship is a relationship from which the photographic object is able to check the display content of the display unit.

(5) The device control apparatus according to any one of (1) to (4), in which the display unit has a free rotational movement with respect to the imaging unit, in such a manner that a displaying direction of the display unit and a direction in which the imaging unit faces toward the photographic object are approximately parallel or approximately antiparallel with each other.

(6) The display control device according to any one off (1) to (5), in which the display unit is configured from a touch panel.

(7) The display control device according to (6), in which a screen displayed on the display unit transitions to a screen for changing setting values corresponding to the automatic recording when contact with the image indicating the information is detected.

(8) The display control device according to (6), in which setting values corresponding to the automatic recording are sequentially switched by detecting contact with the image indicating the information.

(9) The display control device according to any one of (1) to (8), in which the information is displayed on a part in an area on the side, not including a release button, of a display surface of the display unit, when it is assumed that a straight line passes along the center of the screen of the display unit and the center of the imaging unit.

(10) The display control device according to any one of (1) to (9), further including one or more buttons, in which functions for changing settings corresponding to the automatic recording are assigned to one or more of the buttons, respectively, according to a result of detection by the detection unit.

(11) A display control device including a detection unit that detects whether or not a display unit and an imaging unit have a predetermined relationship, in which information relating to compensation of a photographic object image obtained by the imaging unit is displayed on the display unit, according to a result of detection by the detection unit.

(12) The display control device according to (11), in which the compensation is a compensation of beige.

(13) A display control method including defecting whether or not a display unit and an imaging unit have a predetermined relationship, and displaying information relating to automatic recording of a photographic object image obtained by the imaging unit on the display unit, according to a result of detection by the detection unit.

(14) A display control method including detecting whether or not a display unit and an imaging unit have a predetermined relationship, and displaying information relating to compensation of a photographic object image obtained by the imaging unit on the display unit, according to a result of detection by the detection unit.

For example, the present disclosure may include the following configurations.

According to a display controller embodiment, the embodiment includes circuitry configured to cause a display device to display self-portrait photographing information in response to receiving an indication that the display device and an imaging unit are in a predetermined positional relationship.

According to one aspect, the predetermined positional relationship corresponds to an imaging element of the imaging unit facing a substantially same direction as the display device, such that an operator of the imaging unit is positioned to directly view the display device while also being a photographic object of the imaging element.

According to another aspect, the self-portrait photographing information includes information relating to automatic recording.

According to another aspect, the self-portrait photographing information includes information relating to automatic recording via a self timer.

According to another aspect, the self-portrait photographing information includes information relating to automatic recording triggered by a detection of a smiling face.

According to another aspect, the self-portrait photographing information includes information relating to image data correction of a photographic object image.

According to another aspect, the image data collection includes complexion color compensation for correction of skin color of the photographic object image.

According to another aspect, the self-portrait photographing information includes icons displayed on the display device.

According to another aspect, the icons are displayed on a side of the display device that is opposite to another side of the display device that is adjacent to a release button on the imaging unit.

According to another aspect, the predetermined positional relationship being where the display unit is rotated so that a display face of the display unit is oriented in a substantially same direction as an imaging element of the imaging unit, the display face being on top of the imaging element.

According to another aspect, the predetermined positional relationship being where the display unit is slidably positioned so that a display face of the display unit is oriented in a substantially same direction as an imaging element of the imaging unit.

According to another aspect, the display face is positioned underneath the imaging element of the imaging unit.

According to a display control method embodiment, the method includes receiving an indication that a display device and an imaging unit are in a predetermined positional relationship; and displaying with display control circuitry self-portrait photographing information in response to receiving the indication.

According to one aspect of the method, the predetermined positional relationship corresponds to an imaging element of the imaging unit facing a substantially same direction as the display device, such that an operator of the imaging unit is positioned to directly view the display device while being a photographic object of the imaging element.

According to another aspect, the self-portrait photographing information includes information relating to automatic recording.

According to another aspect, the self-portrait photographing information includes information relating to automatic recording via a self timer.

According to another aspect, the self-portrait photographing information includes information relating to automatic recording triggered by a detection of a smiling face.

According to another aspect, the self-portrait photographing information includes information relating to image data correction of a photographic object image.

According to another aspect, the image data correction includes complexion color compensation for correction of skin color of the photographic object image.

According to a non-transitory computer readable medium embodiment, the medium includes instructions stored therein that when executed by a processing circuit cause the processing circuit to perform a display control method, the method including receiving an indication that a display device and an imaging unit are in a predetermined positional relationship; and displaying with display control circuitry self-portrait photographing information in response to receiving the indication.

The present disclosure contains subject matter related to that disclosed in Japanese Priority Patent Application JP 2012-099436 filed in the Japan Patent Office on Apr. 25, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

[REFERENCE SIGNS LIST]

1, 2, 3, 4, 5 Imaging device
10, 20, 30, 40, 50 Housing
11, 21, 31 Display control device
13, 33, 43, 53 Display unit
23 Display unit (Touch panel)
15, 25, 35, 45, 55 Imaging unit
17, 27, 37, 47, 57 Detection unit
19 Display control unit
34a, 34b, 34c Function button
R Release button

The invention claimed is:

1. An information processing apparatus, comprising:
a display device; and
processing circuitry configured to:
receive, in a first imaging state, first image data in a first direction;
receive, in a second imaging state, second image data in a second direction different from the first direction; and
detect whether the information processing apparatus is in the first imaging state or in the second imaging state, wherein
the display device is configured to, when the information processing device is detected as being in the first imaging state, display the first image data and a first set of face related function icons within the displayed first image data, and
when the information processing device is detected as being in the second imaging state, display the second image data and a second set of face related function icons within the displayed second image data or display the second image data with no face related function icons, the second set of face related function icons being different from the first set of face related function icons, and the first set of face related function icons is related to an image adjustment process for processing image data relating to adjusting a face of a person in the first image data.

2. The information processing apparatus according to claim 1, wherein in the second imaging state, the display device displays the first set of face related function icons and the second set of face related function icons with the second image data, and the processing circuitry is further configured to:

control, in the first imaging state, the display device to display a first setting icon when a user touches a function icon in the first set of face related function icons, and control, in the second imaging state, the display device to display a second setting icon when the user touches the function icon in the first set of face related function icons.

3. The information processing apparatus according to claim 2, wherein the first direction is opposite to the second direction.

4. The information processing apparatus according to claim 2, wherein the first direction is a direction in which a display surface of the display device is toward the user, and the second direction is a direction opposite to the first direction.

5. The information processing apparatus according to claim 2, wherein the first setting icon and the second setting icon include at least one of a skin color control icon, a skin tone control icon or a skin texture control icon.

6. The information processing apparatus according to claim 2, wherein the first setting icon is related to image data correction.

7. The information processing apparatus according to claim 1, wherein the first direction is opposite to the second direction.

8. The information processing apparatus according to claim 1, wherein the first direction is a direction in which a display surface of the display device is toward a user, and the second direction is a direction opposite to the first direction.

9. The information processing apparatus according to claim 1, wherein a relationship of a user and an imaging direction is different between the first image data and the second image data.

10. The information processing apparatus according to claim 1, wherein the processing circuitry is configured to switch between the first imaging state and the second imaging state by operating the display device.

11. The information processing apparatus according to claim 1, wherein the first set of face related function icons includes at least one of a skin color control icon, a skin tone control icon or a skin texture control icon.

12. The information processing apparatus according to claim 1, wherein the image adjustment process includes correction of the first image data in such a manner that the skin of person looks smooth.

13. The information processing apparatus according to claim 12, wherein the correction is set with a degree of correction.

14. An information processing method executed by an information processing apparatus including a display device and processing circuitry, the information processing method comprising:

receiving, by the processing circuitry when in a first imaging state, first image data in a first direction;

receiving, by the processing circuitry when in a second imaging state, second image data in a second direction different from the first direction;

detecting, by the processing circuitry, whether the information processing apparatus is in the first imaging state or in the second imaging state;

when the information processing apparatus is detected as being in the first imaging state, displaying, by the display device, the first image data and a first set of face related function icons within the displayed first image data; and when the information processing apparatus is detected as being in the second imaging state, displaying, by the display device, the second image data and a second set of face related function icons within the displayed second image data or displaying the second image data with no face related function icons, the second set of face related function icons being different from the first set of face related function icons, wherein the first set of face related function icons is related to an image adjustment process for processing image data relating to adjusting a face of a person in the first image data.

15. The information processing method according to claim 14, wherein in the second imaging state, the display device displays the first set of face related function icons and the second set of face related function icons with the second image data, the processing circuitry controls, in the first imaging state, the display device to display a first setting icon when a user touches a function icon in the first set of face related function icons, and the processing circuitry controls, in the second imaging state, the display device to display a second setting icon when the user touches the function icon in the first set of face related function icons.

16. The information processing method according to claim 15, wherein the first direction is opposite to the second direction.

17. The information processing method according to claim 15, wherein the first direction is a direction in which a display surface of the display device is toward the user, and the second direction is a direction opposite to the first direction.

18. The information processing method according to claim 15, wherein the first setting icon and the second setting icon include at least one of a skin color control icon, a skin tone control icon or a skin texture control icon.

19. The information processing method according to claim 15, wherein the first setting icon is related to image data correction.

20. The information processing method according to claim 14, wherein the first direction is opposite to the second direction.

21. The information processing method according to claim 14, wherein the first direction is a direction in which a display surface of the display device is toward a user, and the second direction is a direction opposite to the first direction.

22. The information processing method according to claim 14, wherein a relationship of a user and imaging direction is different between the first image data and the second image data.

23. The information processing method according to claim 14, further comprising:

switching between the first imaging state and the second imaging state by operating the display device.

24. The information processing method according to claim 14, wherein the first set of face related function icons includes at least one of a skin color control icon, a skin tone control icon or a skin texture control icon.

25. The information processing method according to claim 14, wherein the image adjustment process includes correction of the first image data in such a manner that the skin of person looks smooth.

26. The information processing method according to claim 25, wherein the correction is set with a degree of correction.

* * * * *